United States Patent
Anderson

(10) Patent No.: US 9,381,885 B2
(45) Date of Patent: Jul. 5, 2016

(54) TETHER AIRBAG CONTROL SYSTEM

(71) Applicant: TK Holdings Inc., Auburn Hills, MI (US)

(72) Inventor: Christopher L. Anderson, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/195,767

(22) Filed: Mar. 3, 2014

(65) Prior Publication Data

US 2014/0246846 A1      Sep. 4, 2014

Related U.S. Application Data

(60) Provisional application No. 61/771,312, filed on Mar. 1, 2013, provisional application No. 14/192,812, filed on Feb. 27, 2014.

(51) Int. Cl.
| | |
|---|---|
| *B60R 21/16* | (2006.01) |
| *B60R 21/233* | (2006.01) |
| *B60R 21/2334* | (2011.01) |
| *B60R 21/239* | (2006.01) |
| *B60R 21/2338* | (2011.01) |

(52) U.S. Cl.
CPC ............. *B60R 21/233* (2013.01); *B60R 21/239* (2013.01); *B60R 21/2334* (2013.01); *B60R 2021/23382* (2013.01)

(58) Field of Classification Search
CPC ............. B60R 2021/2334; B60R 2021/23382; B60R 21/2334
USPC .................. 280/743.2, 743.1, 736, 730.2
See application file for complete search history.

(56) References Cited

U.S. PATENT DOCUMENTS

| | | | |
|---|---|---|---|
| 5,520,413 A | 5/1996 | Mossi et al. | |
| 5,593,179 A | 1/1997 | Maruyama | |
| 5,697,641 A | 12/1997 | McGee et al. | |
| 6,059,312 A | 5/2000 | Staub et al. | |
| 6,276,716 B1 | 8/2001 | Kato | |
| 6,419,267 B1 | 7/2002 | Hashimoto et al. | |
| 6,832,780 B2 * | 12/2004 | Amamori | 280/743.2 |
| 7,000,947 B2 | 2/2006 | Kumagai et al. | |
| 7,393,011 B2 * | 7/2008 | Keshavaraj | 280/743.2 |
| 7,455,317 B2 | 11/2008 | Bito | |
| 7,543,850 B2 | 6/2009 | Bachraty et al. | |
| 7,857,347 B2 * | 12/2010 | Abe et al. | 280/743.2 |
| 7,938,445 B2 * | 5/2011 | Smith et al. | 280/743.2 |
| 8,002,309 B2 | 8/2011 | Kim et al. | 280/729 |
| 8,342,573 B2 | 1/2013 | Kwon | 280/743.2 |
| 8,371,612 B2 * | 2/2013 | Williams | 280/743.2 |
| 8,419,050 B2 | 4/2013 | Yoo | |

(Continued)

FOREIGN PATENT DOCUMENTS

| | | |
|---|---|---|
| FR | 2577903 | 8/1986 |
| JP | 10-100827 | 4/1998 |
| KR | 20040073017 | 8/2004 |

*Primary Examiner* — Faye M Fleming
(74) *Attorney, Agent, or Firm* — L.C. Begin & Associates, PLLC

(57) ABSTRACT

An airbag includes at least one panel defining an interior of the airbag and a divider attached to the at least one panel so as to divide the interior into a plurality of chambers. An internal tether is attached to the at least one panel and to the divider so as to limit movement of the divider in a direction toward one of the chambers.

33 Claims, 12 Drawing Sheets

(56) References Cited

U.S. PATENT DOCUMENTS

| | | | |
|---|---|---|---|
| 8,480,122 B2 | 7/2013 | Ohara | 280/729 |
| 8,657,330 B1 * | 2/2014 | Choi | 280/730.2 |
| 2001/0015546 A1 | 8/2001 | Kato | |
| 2004/0119271 A1 | 6/2004 | Webber | |
| 2010/0001495 A1 | 1/2010 | Sekino et al. | |
| 2010/0133797 A1 * | 6/2010 | Kim et al. | 280/743.2 |
| 2010/0225094 A1 * | 9/2010 | Rose et al. | 280/729 |
| 2010/0244419 A1 | 9/2010 | Maripudi | |
| 2011/0260431 A1 | 10/2011 | Kwon | 280/730.1 |
| 2012/0025497 A1 | 2/2012 | Yoo | |
| 2012/0112441 A1 | 5/2012 | Ohara | 280/729 |
| 2012/0248746 A1 | 10/2012 | Yamamoto | |
| 2013/0020787 A1 | 1/2013 | Abele et al. | |
| 2014/0151985 A1 | 6/2014 | Hotta et al. | |

* cited by examiner

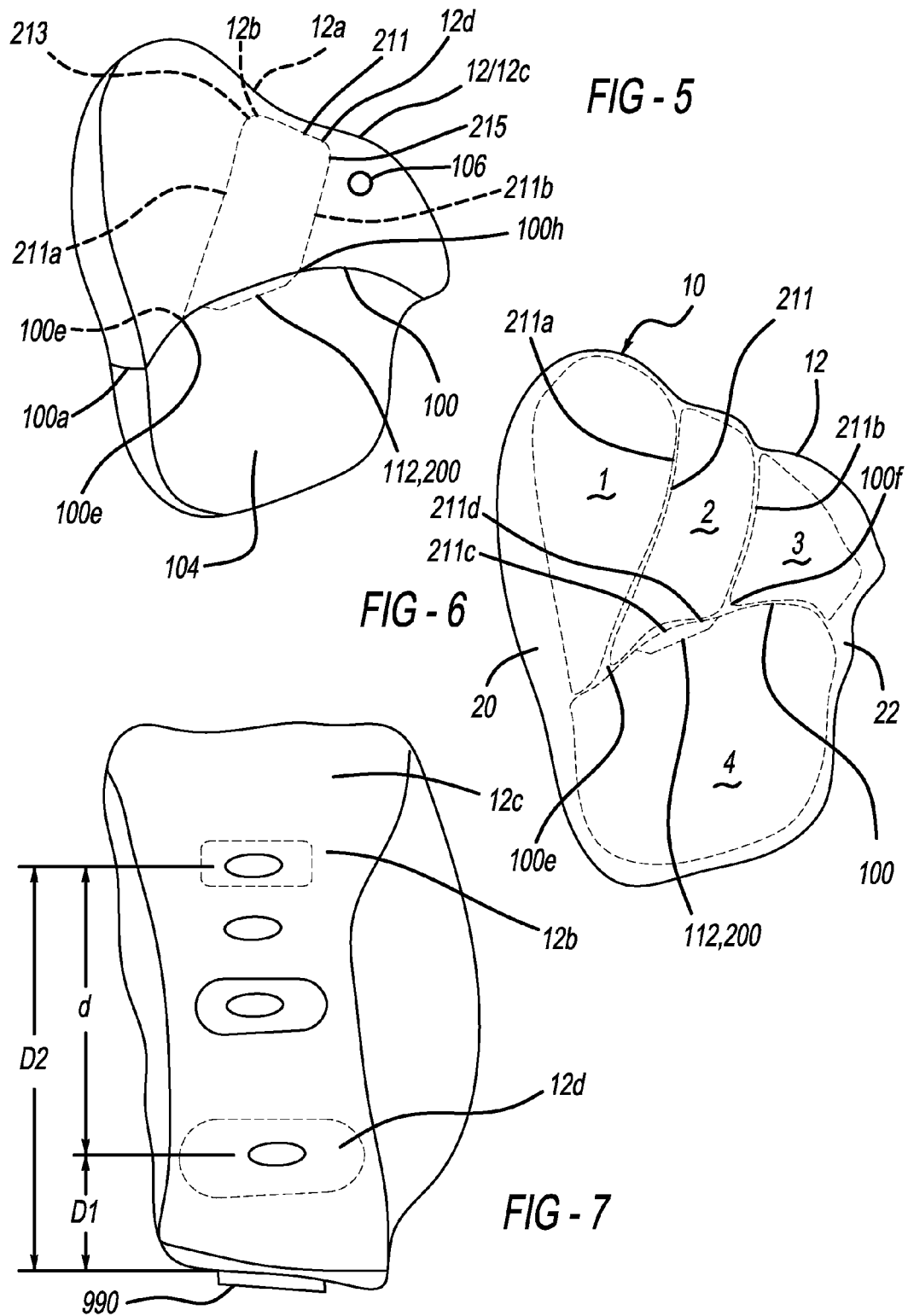

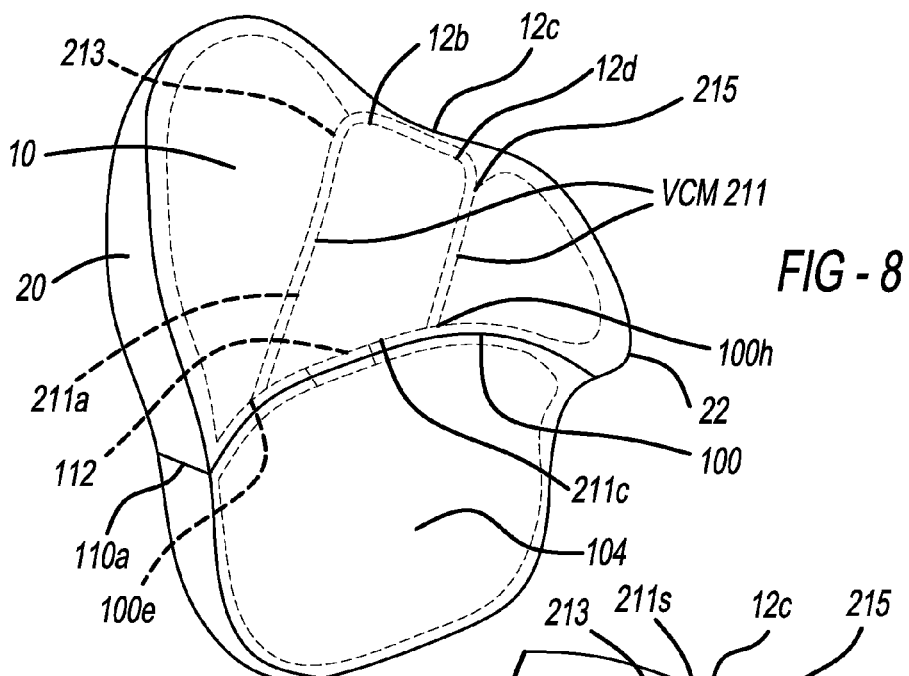
FIG - 8
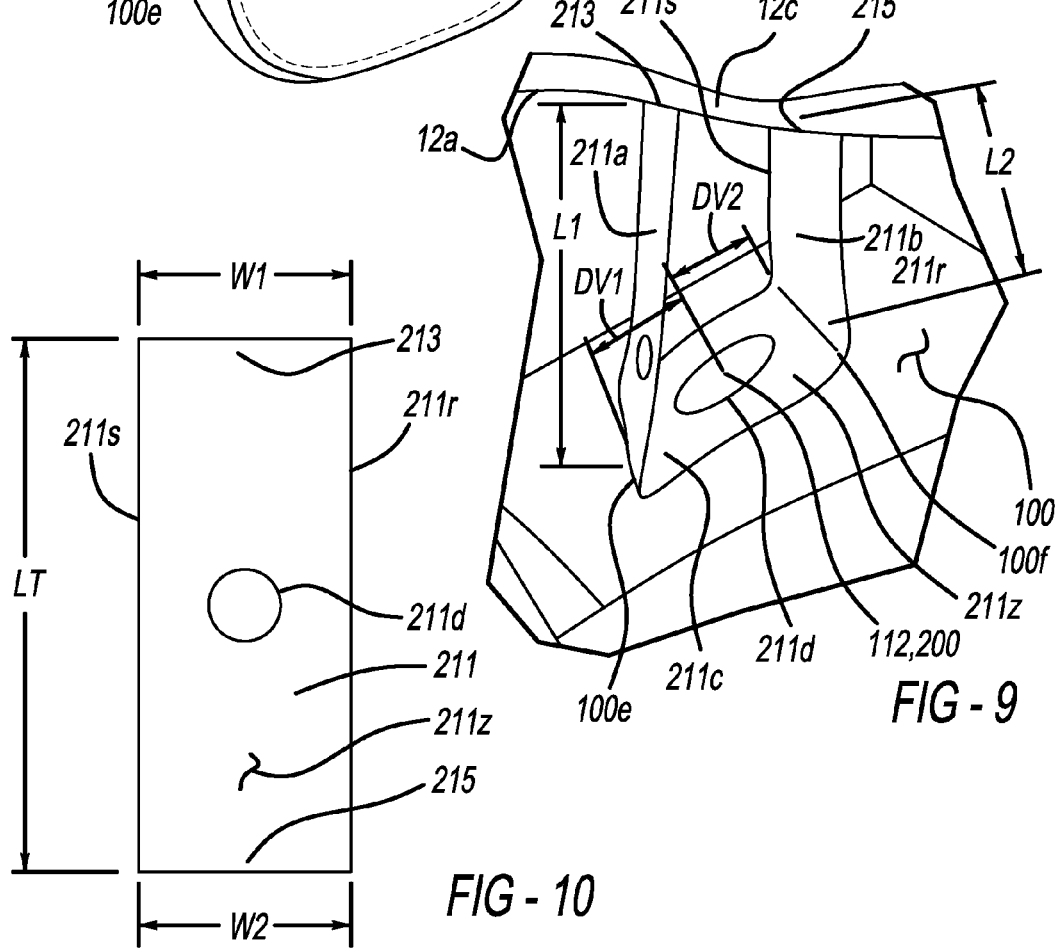
FIG - 9
FIG - 10

US 9,381,885 B2

TETHER AIRBAG CONTROL SYSTEM

CROSS-REFERENCE TO RELATED APPLICATIONS

This application claims the benefit of U.S. Provisional Application Ser. Nos. 61/771,312, filed on Mar. 1, 2013 and 14/192,812 filed on Feb. 27, 2014, the disclosures of which are incorporated herein by reference in their entireties.

BACKGROUND OF THE INVENTION

Airbags and other pliable and inflatable restraints are being designed using releasable tethers to selectively modify the performance of the airbag or restraint cushion during deployment. In certain airbags, for example, tension in an associated tether maintains a valve controlling an airbag vent in a closed position. At some point during or after deployment of the inflatable device, tension in the tether may be relieved to permit actuation of the vent valve and subsequent release of airbag gases.

Nevertheless, certain challenges remain. One challenge that remains is the ability to control the pressure differential between various regions of the airbag and the geometry of the various regions of the airbag as the airbag deployment progresses. Stated another way, the ability to control the dynamic volumes of the airbag at the upper or head/neck region, at the intermediate or thoracic region, and/or at the bottom of the airbag, remains a challenge. In general, with the onset of almost instantaneous pressure in the airbag upon a collision event, various concerns including the size and position of the occupant adjacent the deploying airbag warrant some type of volume control of the various regions of the airbag to control the force that might typically occur due to the onset of airbag pressure. State of the art airbags do not typically differentiate between the various regions and therefore, it would be an improvement in the art to create a pressure differential based on specific design criteria for various applications.

The embodiments of the present invention provide a novel tethered volume control mechanism or system within an airbag.

SUMMARY OF THE INVENTION

In one aspect of the embodiments described herein, an airbag is provided including at least one panel defining an interior of the airbag and a divider attached to the at least one panel so as to divide the interior into a plurality of chambers. An internal tether is attached to the at least one panel and to the divider so as to limit movement of the divider in a direction toward one of the chambers In another aspect of the embodiments of the described herein, an airbag is provided including at least one panel defining an interior of the airbag, and a divider positioned in the interior so as to divide the interior into an upper chamber and a lower chamber. An internal tether is attached to the at least one panel and to the divider so as to partition the upper chamber into a plurality of adjacent sub-chambers.

BRIEF DESCRIPTION OF THE DRAWINGS

FIG. 5 is a side perspective view of another embodiment of the passenger-side airbag of FIGS. 1-4, shown in an inflated state and incorporating an internal tether.

FIG. 6 is the perspective view of FIG. 5 showing zones formed in the airbag interior by the tether.

FIG. 7 is a plan view of the airbag shown in FIGS. 5 and 6 showing exemplary locations of attachment of the tether to the airbag main panel.

FIG. 8 is the perspective view of FIGS. 5 and 6 showing additional features of the embodiment of the airbag.

FIG. 9 is a partial cross-sectional side view of the embodiment of FIG. 8 showing attachment of the tether to the airbag divider and main panel.

FIG. 10 is a plan view of an internal tether in accordance with one embodiment described herein.

DETAILED DESCRIPTION

Figure 1:
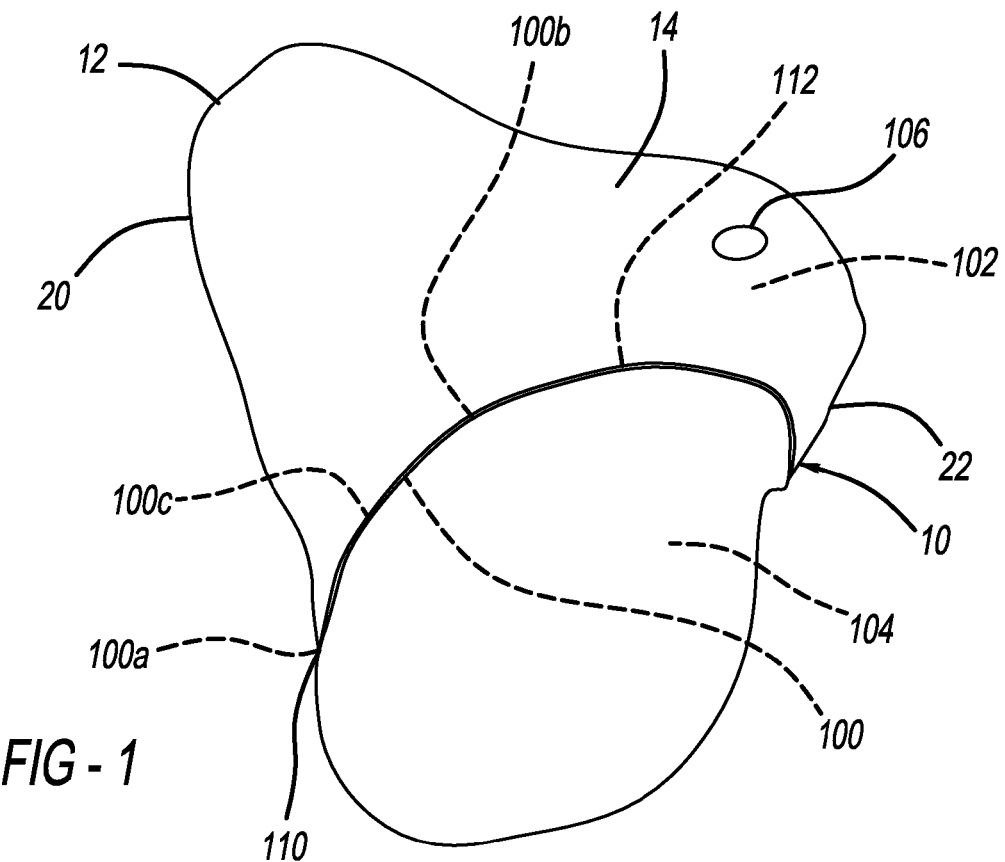
FIG. 1 is a side view of a passenger-side airbag (in an inflated state) in accordance with one embodiment of the present invention.
Figure 2:
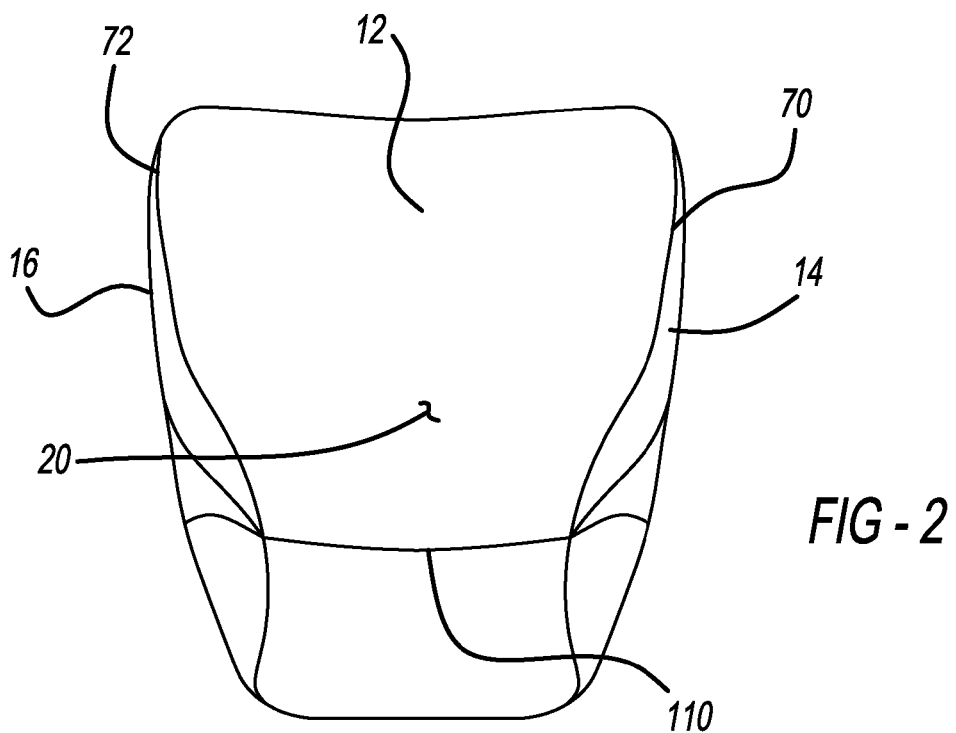
FIG. 2 is a front view of the airbag of FIG. 1.
Figure 3:
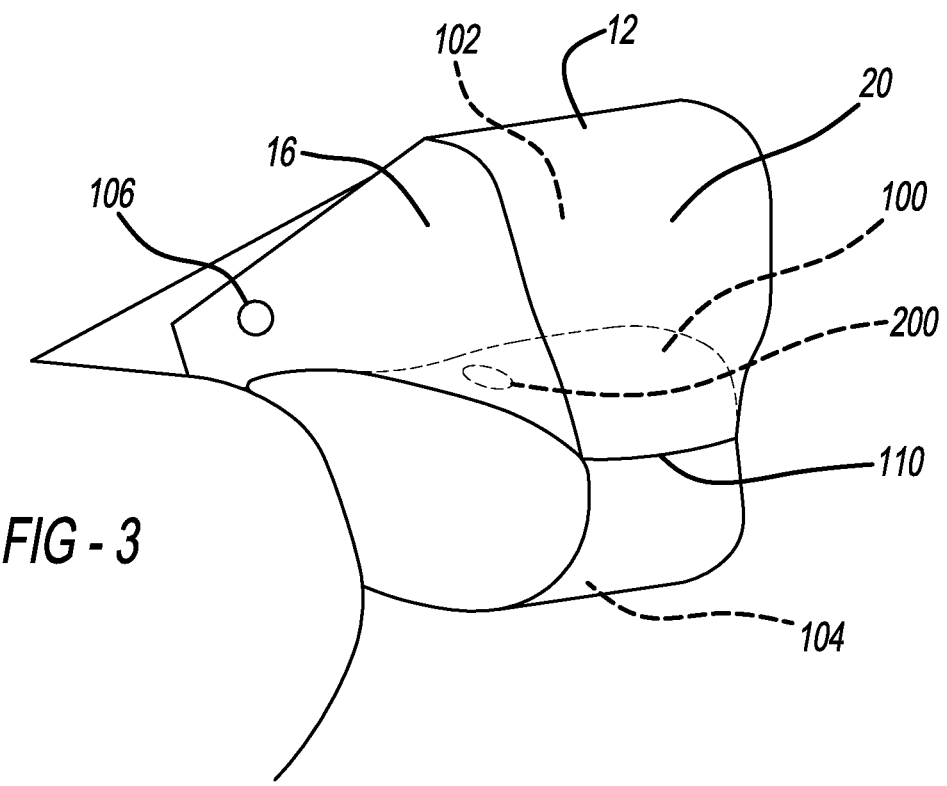
FIG. 3 is a schematic perspective view of the airbag of FIG. 1, showing elements of the airbag interior.

Embodiments of the present invention will be described below with reference to the drawings.

FIGS. 1-4 are views of a passenger-side airbag 10 (in an inflated state) according to an embodiment of the present invention. The airbag embodiment shown in FIGS. 1-4 is formed from three panels. Specifically, the airbag is formed of a main panel 12, a right side (when viewing the airbag from a seated position) panel 14, and a left side panel 16 opposite the right side panel 14. Each of the side panels 14, 16 is generally planar (when the airbag 10 is inflated). The main panel 12 connects the left and right panels and defines an outer wall of the airbag 10. As a result, the entirety of the right edge of the main panel 12 is connected along a seam 70 (e.g., by stitching, sewing, or other suitable means) to the right panel 14 and the entirety of the left edge of the main panel 12 is connected along a seam 72 (e.g., by stitching, sewing, or other suitable means) to the left panel 16.

The main panel 12 has both a front, impact side 20 and a rear, inflation side 22. As well as defining the front and rear of the airbag 10, the ends of the main panel 12 are joined at the rear inflation side. In addition, the rear inflation side 22 has slits (not shown) which are sized to receive an inflator (not shown), and may also include holes (not shown) which are sized to receive bolts (or other suitable fasteners) that are configured to secure the airbag 10 to the body of an automobile (or other device).

Referring to FIGS. 1-4, a divider 100 is stitched or otherwise suitably attached along a perimeter thereof to interior surfaces of the main, left and right panels using any suitable attachment method (for example, stitching, adhesives, etc.) so as to restrict gas flow between portions of the airbag interior on either side of the divider. In one embodiment, the divider 100 is attached to the panel interior surfaces so as to form, to the greatest degree possible, a gas-tight seal between the divider and the panels to which it is attached. Divider 100 divides the airbag interior into an upper chamber 102 and a lower chamber 104. Portions of one or more of panels 12, 14, 16 defining upper chamber 102 incorporate one or more vents 106 therein to release gas from the upper chamber in a controlled manner during contact between a passenger and the airbag.

In the embodiments of the present invention, the inflated shapes of the airbag 10 and divider 100 and the positions of the intersections between divider 100 and the interior portions of the panels 12, 14, 16 to which the divider is attached are specified so as to ensure that the head and neck regions of passengers of various sizes impact the bag along the exterior of the upper chamber 102 of the bag (i.e., that the upper chamber 102 absorbs the impact of the head and neck regions of the passenger).

Referring to FIGS. 1-4, in one example, edge 100a of divider 100 attached to an interior surface of the front side 20 of main panel 12 defines a leading edge 100a of the divider 100. Leading edge 100a is attached to the main panel front side 20 along seam 110 and is configured such that the leading edge 100a and the portion 110a of the seam 110 attaching the leading edge to the front side will reside below the neck and head regions of any passenger contacting the airbag front side (more specifically, within the zone Z shown in FIG. 20 and defined below), when the airbag mounted in the vehicle and is fully inflated. In this configuration of the airbag, the passenger head and neck regions will always contact the airbag along an exterior of the bag upper chamber 102.

Figure 18:
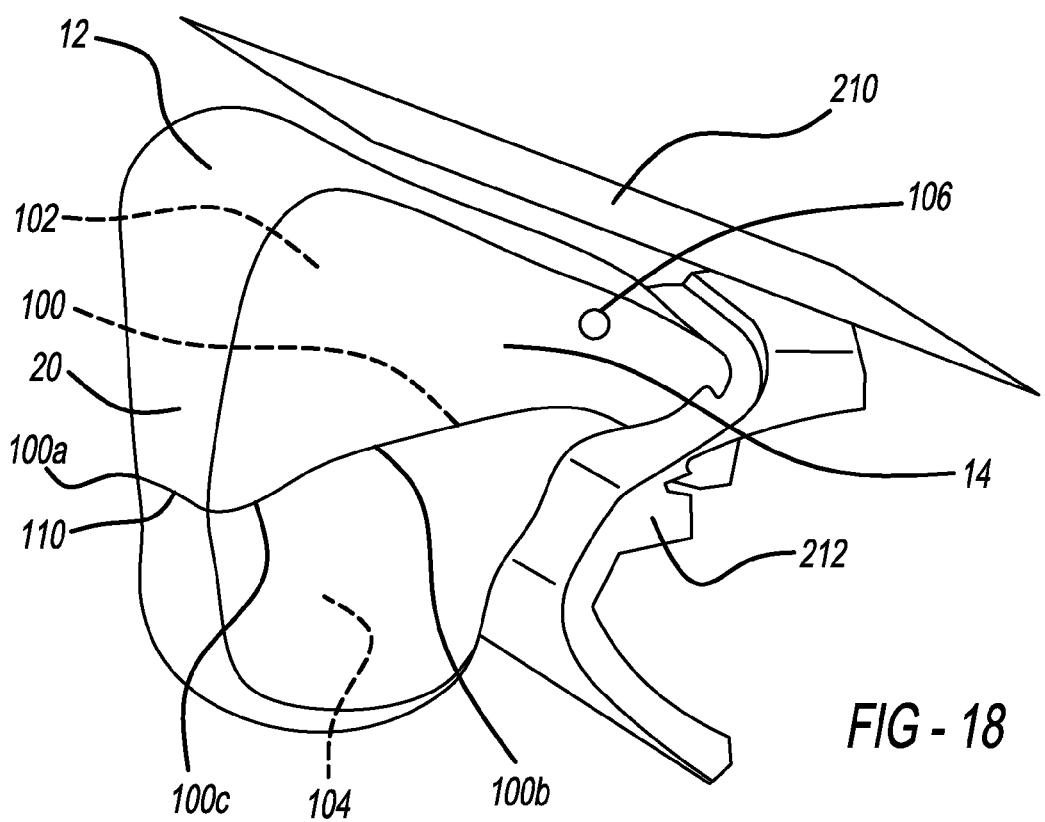
FIG. 18 is a perspective view of the passenger-side airbag of FIGS. 1-4, shown in an inflated state and mounted in a vehicle.

In the particular embodiment shown in FIGS. 1-4, divider 100 is attached to the inner surfaces of the airbag panels 12, 14, 16 so as to form a curved surface 100b having a downwardly angling portion 100c terminating in leading edge 100a connected to front side 20. However, the seams connecting the divider 100 to the main and side panels may have any locations and/or configurations necessary to facilitate attachment to the panel 12 at the desired location within zone Z as described herein. For example, FIG. 18 shows the airbag embodiment of FIGS. 1-4 in an inflated state and mounted in a vehicle.

Figure 19:
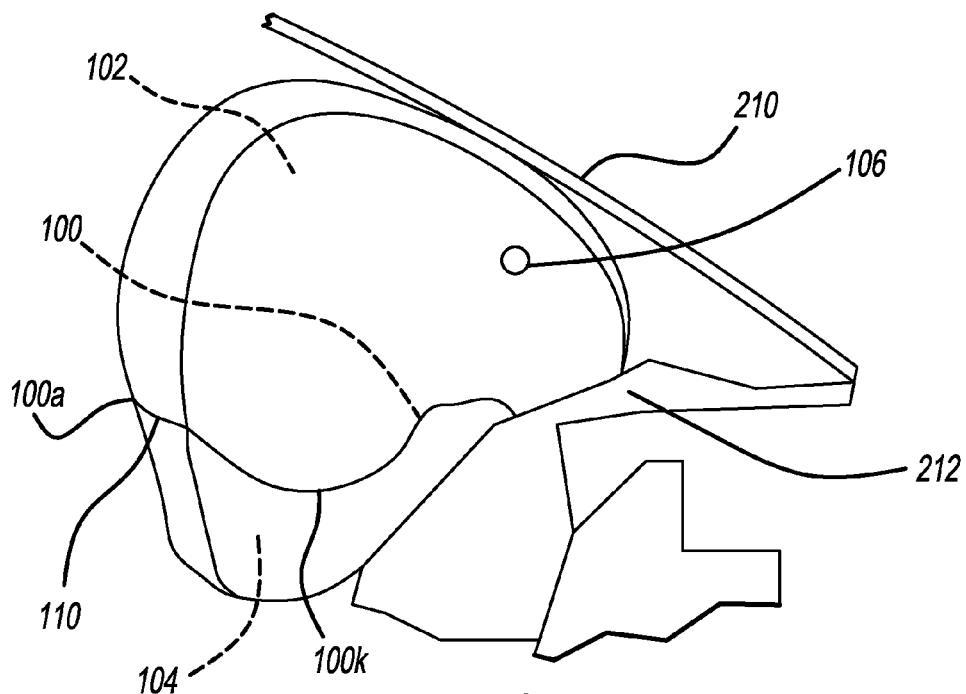
FIG. 19 is a perspective view of a passenger-side airbag in accordance with another embodiment of the invention, shown in an inflated state and mounted in a vehicle.
Figure 20:
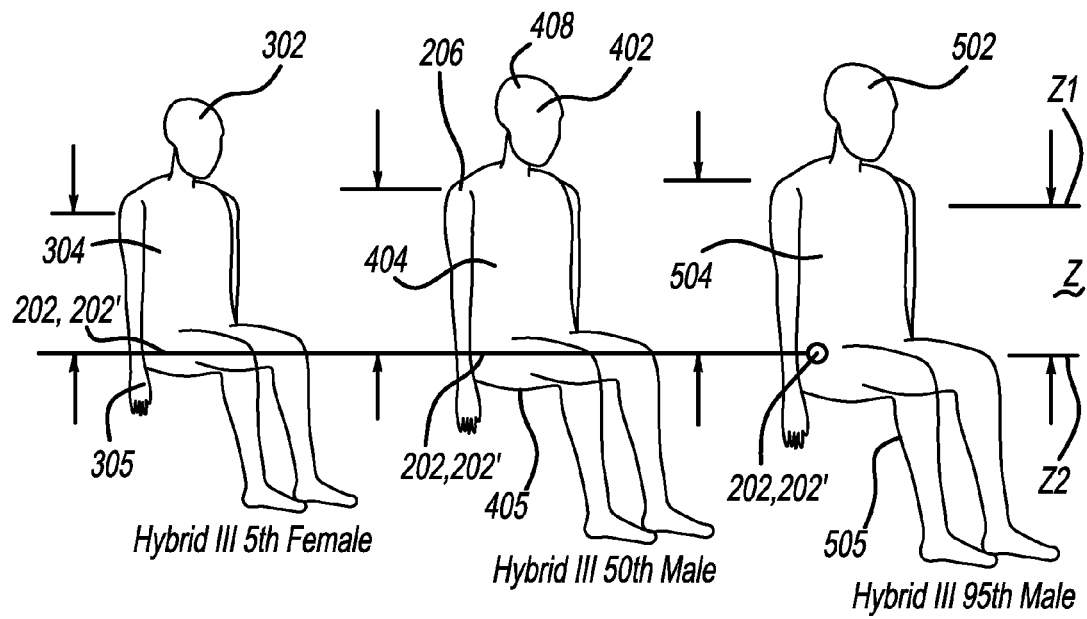
FIG. 20 is a schematic view showing relative proportions of Anthropomorphic Test Devices and relevant parameters used to define the desired positioning of the divider within the airbag, in accordance with embodiments of the present invention.

Referring to FIGS. 19 and 20, in the embodiments described herein, the divider leading edge 100a is attached to the main panel along a seam 110 positioned so as to reside within a zone Z defined at a lower end Z2 by the hip pivot 202 of a seated Hybrid III 5th female ATD 305, and at an upper end Z1 by the shoulder pivot 206 of a seated Hybrid III 50th ATD 405, inclusive. These boundary positions and other characteristics of all the test ATD's described herein are specified in 49 CFR Part 572, which is incorporated herein by reference in its entirety, and which may be found, for example, at http://www.gpo.gov/fdsys/pkg/CFR-2011-title49-vol7/pdf/CFR-2011-title49-vol7-part572.pdf. In a particular embodiment, the hip pivot 202 of the seated Hybrid III 5th female ATD resides at a vertical distance of 3.30 inches above the portion of the seat in contact with the ATD, and the shoulder pivot 206 of the seated Hybrid III 50th male ATD resides at a distance of 17.5 inches above the portion of the seat in contact with the ATD. Thus, the dimension of the zone Z is 14.2 inches.

Figure 21:
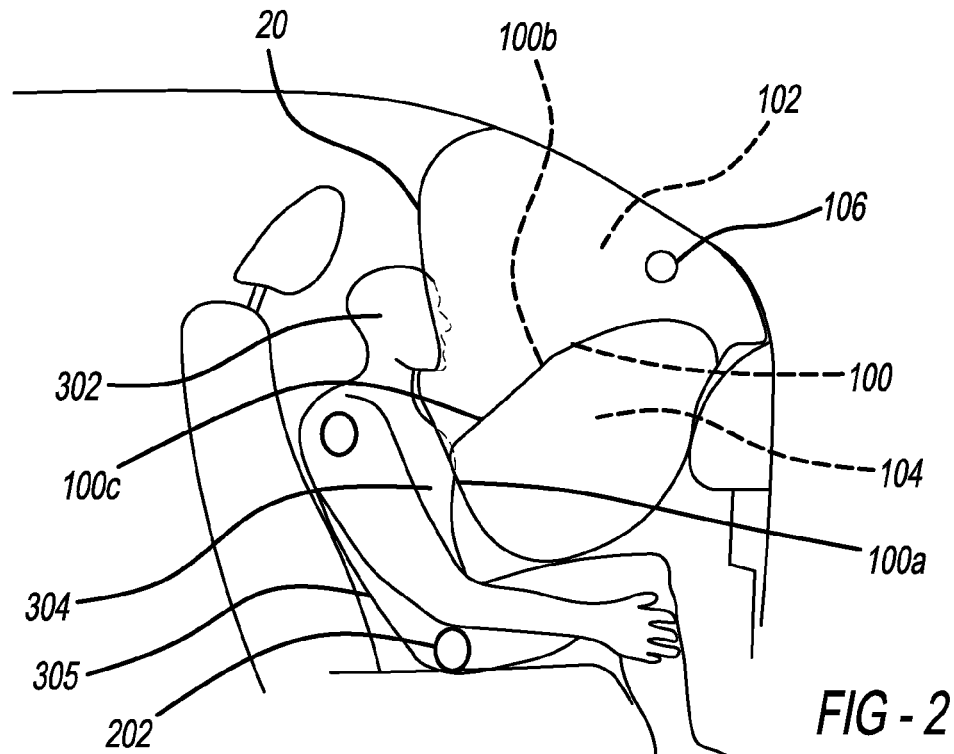
FIG. 21 is a side view of a Hybrid III 5th percentile female test Anthropomorphic Test Device contacting a deployed airbag in accordance with positioning of the divider within the airbag, in accordance with embodiments.
Figure 22:
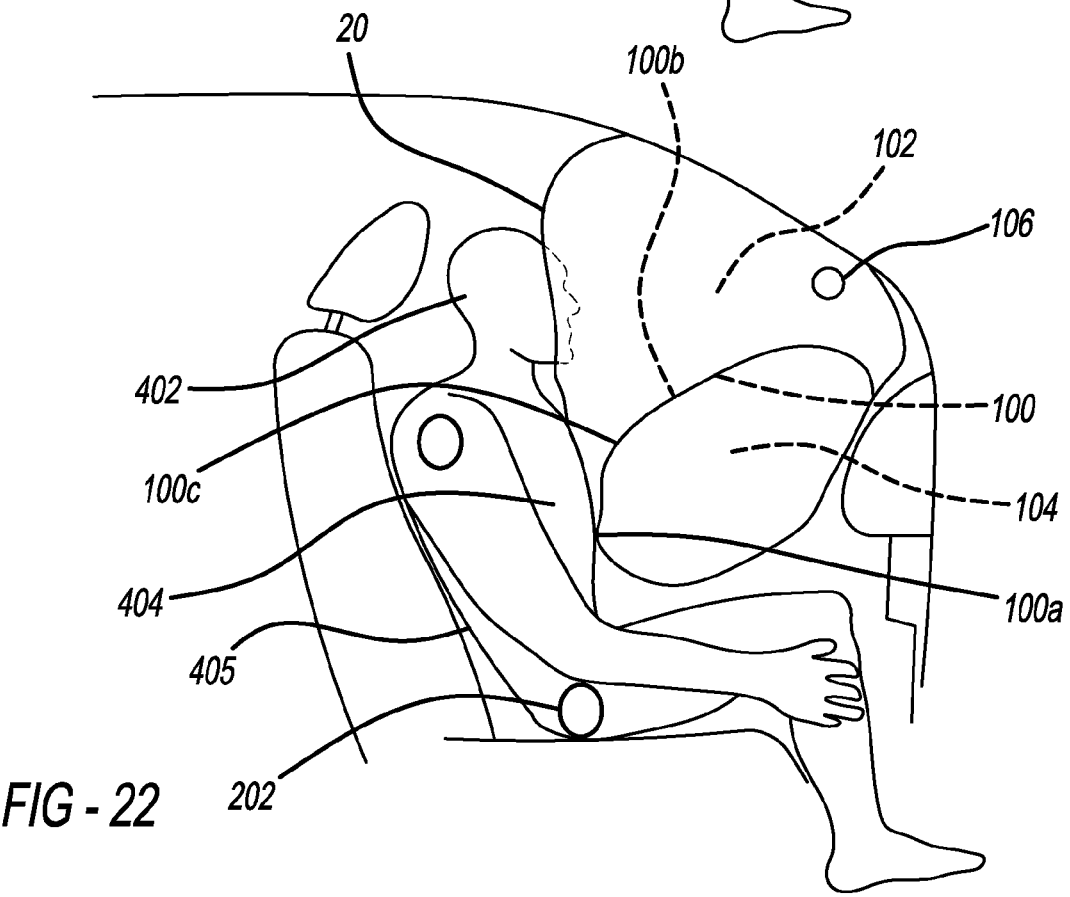
FIG. 22 is a side view of a Hybrid III 50th percentile male Anthropomorphic Test Device contacting a deployed airbag in accordance with positioning of the divider within the airbag, in accordance with embodiments.

It is noted that the hip pivots of the seated ATD's 305, 405, and 505 are collinear or at the same level, so that the hip pivot of the seated Hybrid III 50th male ATD 405 may be referred to as 202'. This common boundary of the zone Z may also serve as a reference axis. Also, in this embodiment, the portions of the body located above the respective shoulder pivots on ATD's 305, 405 and 505 are considered to define the respective head and neck regions of the ATD's. FIG. 21 shows contact between the front or contact face of a deployed airbag 10 and the divider leading edge seam 110a positioned as just described, and a Hybrid III 5th female ATD 305. FIG. 22 shows contact between a deployed airbag 10 of the same design shown in FIG. 21, and a Hybrid III 50th male ATD 405. It is seen that both of ATD's 305 and 405 contact the seam 110a connecting the divider leading edge 100a to the airbag main panel 12 within the zone Z previously described.

In the particular embodiment shown in FIGS. 1-4, divider 100 is attached to the inner surfaces of the airbag panels 12, 14, 16 so as to form a curved surface 100b having a downwardly angling portion 100c terminating in leading edge 100a connected to front side 20. However, the seams connecting the divider 100 to the main and side panels may have any locations and/or configurations necessary to facilitate attainment of the desired volume ratio as described herein, as long as the attached location of the divider leading edge 100a meets the criteria set forth above.

An inter-chamber venting system is provided to permit gas to flow from the upper chamber into the lower chamber, and also to restrict backflow from the lower chamber 104 into the upper chamber 102. In one embodiment, the venting system includes one or more openings 200 formed in divider 100 to enable fluid communication from upper chamber 102 into lower chamber 104. Although the embodiment shown in FIGS. 1-4 shows a single opening 200, multiple openings may be provided in the divider to control the rate of gas flow between chambers and the order in which the various portions of the airbag are inflated.

In one embodiment, a flow restriction valve 112 (shown schematically in the drawings) is positioned along or incorporated into or otherwise operatively coupled to divider 100 for controlling gas flow between the upper and lower chambers through divider opening 200. The valve may be structured such that an actuation response time of the valve in attenuating or impeding gas flow from lower chamber 104 into upper chamber 102 is proportional to the pressure differential between the upper and lower chambers. The valve may also be structured such that a backflow rate of gases through the valve and into the upper chamber is proportional to the pressure differential between the upper and lower chambers. In a particular embodiment, valve 112 is incorporated into the structure of the divider 100 and opening 200 is incorporated into the structure of the valve. In addition, in an embodiment including multiple openings formed in the divider 100, a valve may be incorporated into or otherwise operatively coupled to divider 100 for controlling gas flow through each opening or through only a portion of the openings.

Valve 112 may have any of a number of structures suitable for controlling gas flow in the airbag interior, in the manner described herein. In one embodiment, the valve has the structure shown in U.S. Patent Application No. 61/862,491, the disclosure of which is incorporated herein by reference. In another embodiment, the valve has the structure shown in U.S. Patent Application No. 61/865,095, the disclosure of which is also incorporated herein by reference. The gas flow rate from the upper chamber 102 into the lower chamber 104 may be controlled in a known manner by controlling the valve structure and dimensions.

Figure 4:
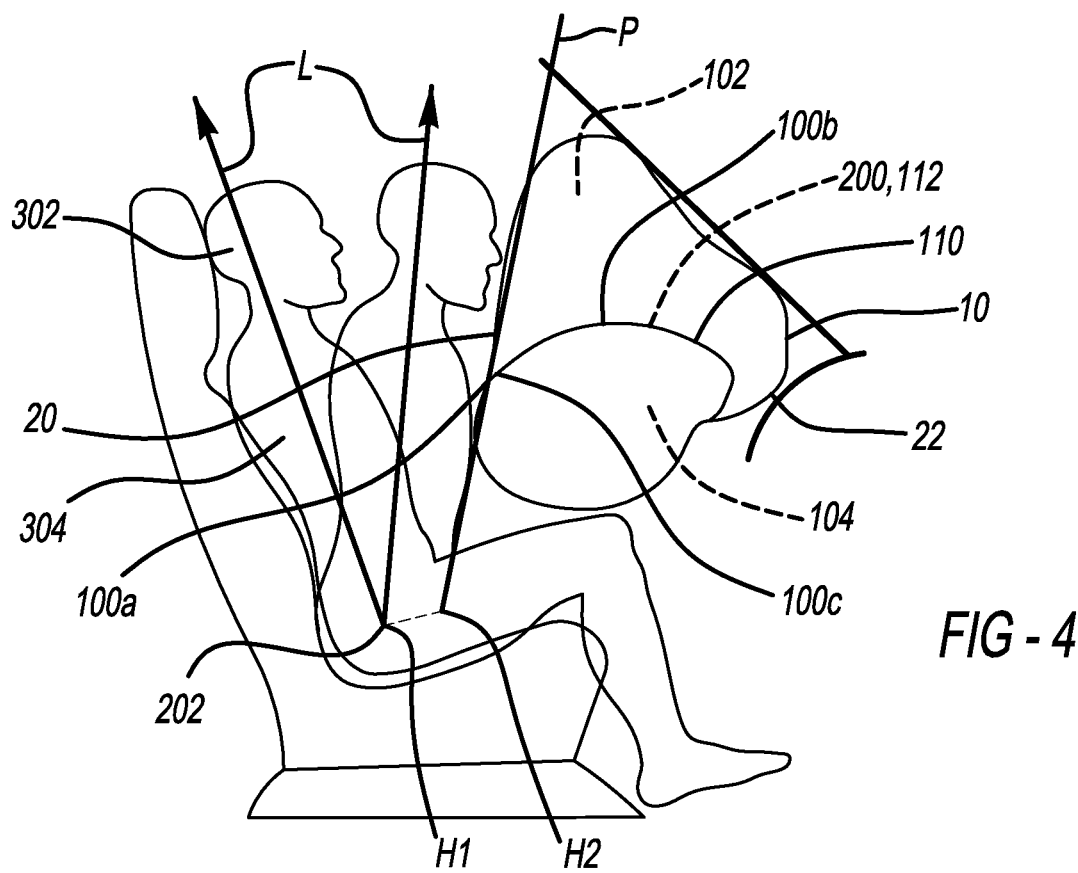
FIG. 4 is a side view of the airbag of FIG. 1 mounted and deployed in a vehicle in front of a seated passenger.

In the embodiments of the present invention described herein, the various airbag elements are shaped and connected to each other so that, when fully inflated, the front side 20 of the bag aids in maintaining alignment of the head, neck, and thoracic body regions along a line L as shown in FIG. 4 during impact with the airbag and after contact with the bag. It is desirable to maintain this alignment during and after contact with the bag, so that the entire upper body of the passenger (i.e., the head, neck, and thoracic regions) effectively pivots about the hip axis of the passenger, as shown in FIG. 4. To this end, as seen in FIG. 4, the bag is structured such that the portions of the inflated bag front side 20 contacted by the passenger form an essentially flat plane, indicated by the line P in the drawing. It is also desirable that the line L along which these body regions lie be parallel with the plane P during and after impact with the airbag, to aid in preventing differential motion of the head/neck region and the thorax region (i.e., a bending of the neck and head regions relative to the thorax).

At the early stages of airbag inflation, the occupant seatbelt (not shown) tensions to restrain the occupant's lower thoracic region in the seat. Thus, the hip point 202 resides at a first location H1. At a later stage of inflation, as the seatbelt tensioner relaxes, thereby permitting the hip point 202 to shift from location H1 to a second location H2, closer to or lying on plane P. Thus, during the later stages of inflation, due to movement of the occupant, the line L approaches or lies along plane P.

In another aspect of the embodiments described herein, a volume ratio (VR) of the airbag is defined as:

$$VR = V_{upper}/(V_{upper} + V_{lower}),$$

where $V_{upper}$ is the volume of the upper chamber 102 when fully inflated and $V_{lower}$ is the volume of the lower chamber 104 when fully inflated. As a result of the positioning of leading edge 100a so as to reside in zone Z as described herein, the embodiments of the present invention define a range of ratios of the upper chamber volume $V_{upper}$ when fully inflated to the total interior airbag volume ($V_{upper}$ + $V_{lower}$) when fully inflated. In the embodiments described herein, the range of desired volume ratios is 35% to 85% inclusive. Stated another way, the range of volume ratios of the airbag is governed by the following relation:

$$35\% \leq V_{upper}/(V_{upper} + V_{lower}) \leq 85\%$$

The governing equation for the volume ratio for dual-chambered airbags in accordance with embodiments of the present invention is the ratio of the upper chamber alone over the total of both upper and lower chambers measured simultaneously, using the Ping Pong Ball Volume Method.

The particular volume ratio selected for a given airbag application is determined by such factors as the relative locations and dimensions of interior features of the vehicle in which the airbag is to be used. These characteristics determine the volume between the seated passenger, a windshield 210 and an instrument panel 212 (or other bag stowage location), for example, available for deployment of the airbag. For example, a relatively smaller available deployment space may require a relatively smaller airbag. In this case, the airbag volume ratio ($V_{upper}/(V_{upper} + V_{lower})$) may need to be tailored as described herein in order to optimize occupant protection.

The structure of the divider 100 and the locations at which the divider is attached to the main and side panels may be specified so as to provide a desired volume ratio within the specified range. For example, a relatively greater volume ratio may be achieved by locating and securing the divider at a relatively lower position within the airbag interior, so that the upper chamber volume is larger relative to the total interior volume of the bag. Conversely, a relatively lower volume ratio may be achieved by locating and securing the divider at a relatively higher position within the airbag interior, so that the upper chamber volume is smaller relative to the total interior volume of the bag.

It has been found that passenger-side airbags structured as described above are especially effective in providing optimal cushion performance for various sizes of adults and also for achieving low risk deployment performance specifications for 3 & 6 year old Anthropomorphic Test Devices (ATDs), as specified in the safety regulations previously mentioned. The proportioning of the pressures in the upper and lower chambers as previously described, in conjunction with the bag structure previously described, enable the airbag chamber surfaces to absorb energy responsive to interaction with both the heavier thorax and the smaller and lighter head region, so as to help maintain body alignment along line L (FIG. 4) during contact between the passenger and the airbag. Particularly from the perspective of the adult $5^{th}$ female and adult $50^{th}$ male, optimum airbag performance is provided by maintaining, to the greatest degree possible, both of these body regions in line with respect to one another, while enabling the upper body as a whole to pivot at the hip axis.

Figure 11:
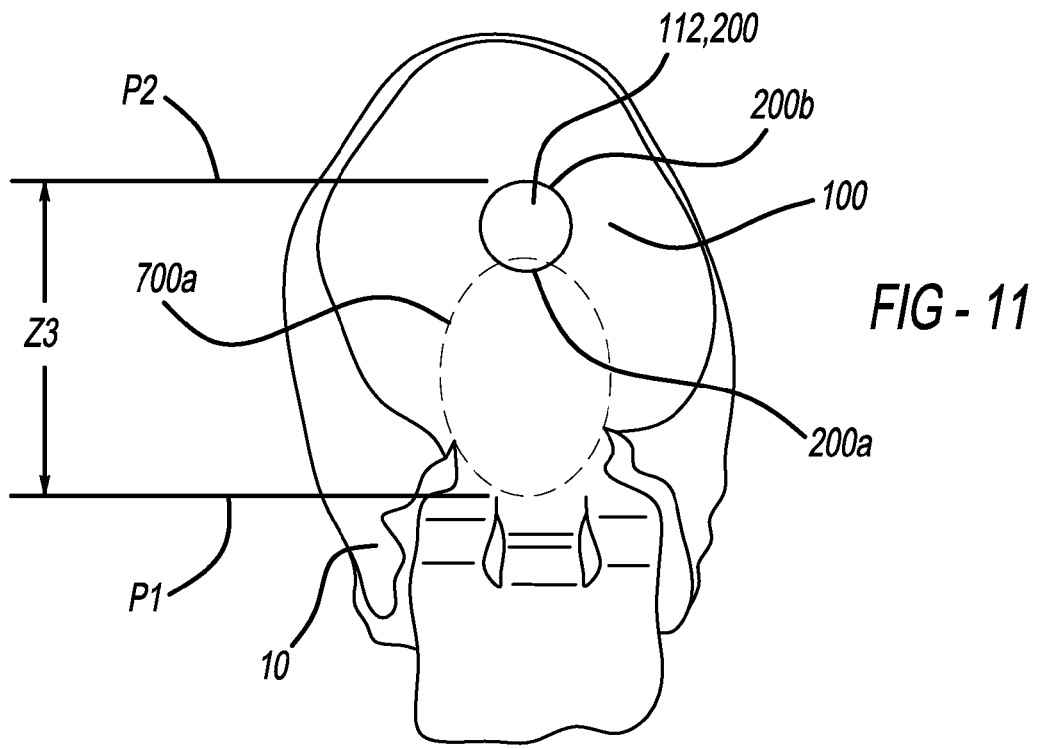
FIG. 11 is a dividing panel in plan view of an uninflated airbag showing a location of a representative inter-chamber vent opening in the divider.
Figure 12:
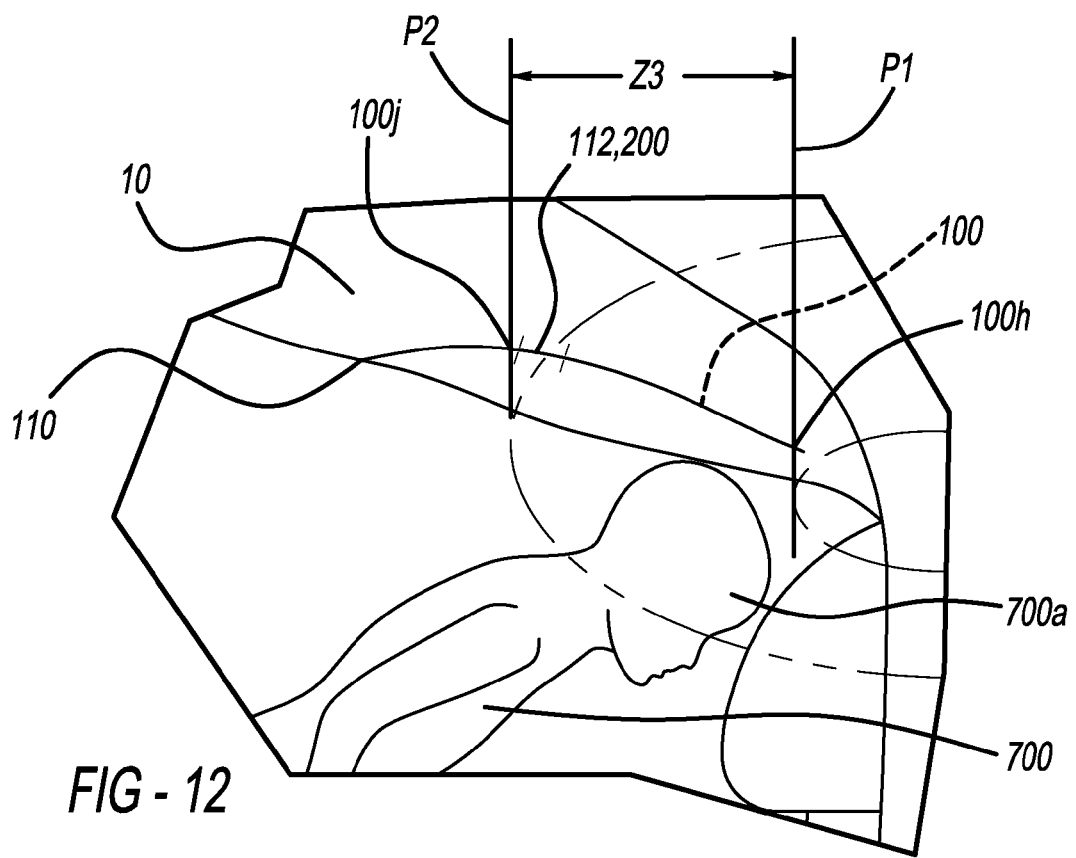
FIG. 12 is a side view of a portion of the airbag shown in FIG. 11 in an initial stage of inflation, showing a location of the inter-chamber venting.
Figure 12A:
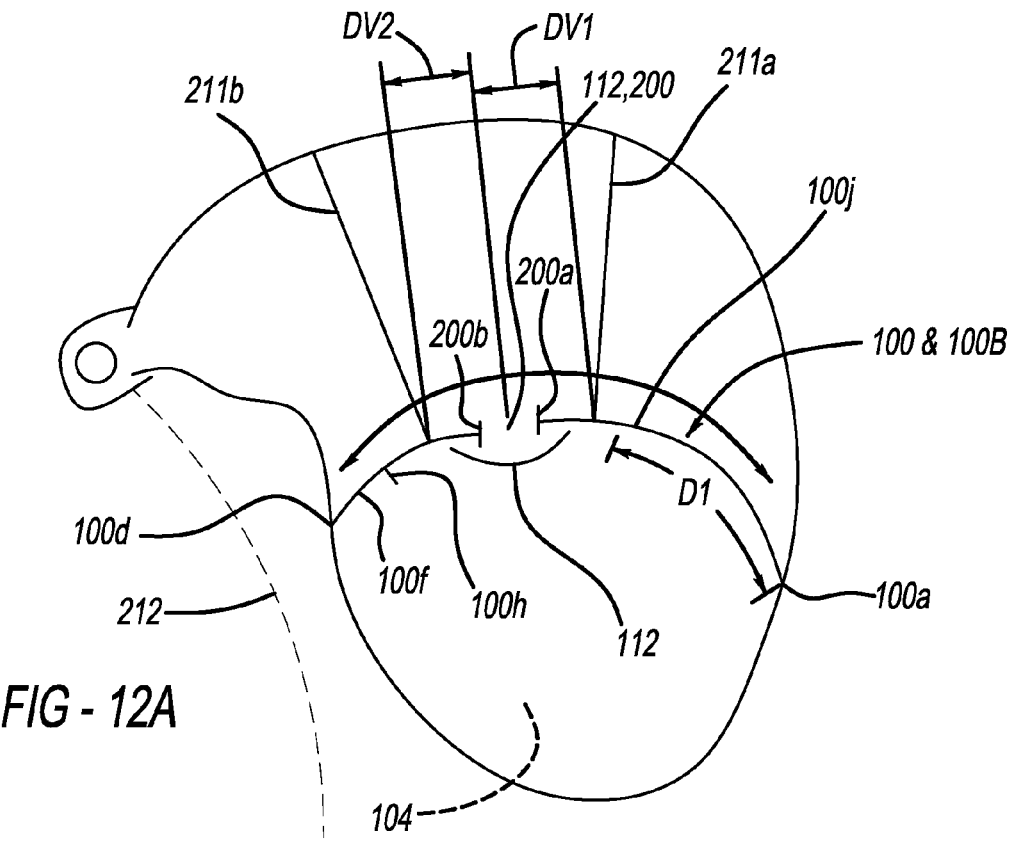
FIG. 12A is cross-sectional side view of the airbag embodiment shown in FIG. 12.
Figure 13:
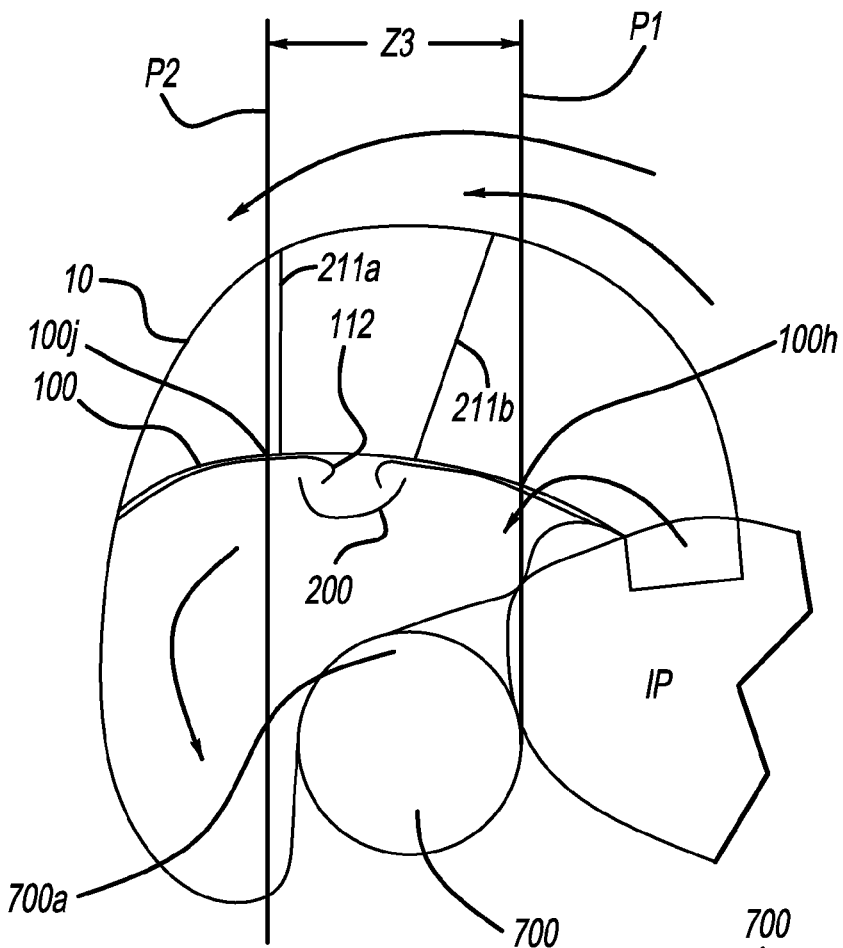
FIG. 13 is a side view of the airbag of FIG. 12 showing a later stage of inflation of the airbag.

Referring to FIGS. 11-13, in yet another embodiment, a valve mechanism 112 controls and provides a directional gas flow through one or more openings 200 formed in divider 100. It has been found that airbag performance during filling is affected by the distance (or distances) 100f of the opening(s) 200 from the inflator side 100d of the airbag (as seen in FIG. 12A), and also by the distance (or distances) of the opening(s) 200 from the front or passenger side 100a of the airbag along an axis extending parallel to the fore-aft axis of the vehicle. More specifically, if leading edge 200a of the openings 200 (or the leading edge of any opening, if multiple openings are used) is located nearer to the occupant contact side of the cushion than a location 100j defined by a distance D1 from the occupant side (as measured from the seam connecting the divider 100 with the front portion of main panel 12 and along a surface of the divider, the airbag will have a tendency to pull excessively downward during inflation of the upper chamber 102, thereby pulling the airbag out of the desired alignment with the passenger's body shown in FIG. 4, prior to contact between the passenger and the inflating airbag.

Also, if a rear-most edge 200*b* of the opening 200 (or the rearmost edge of any opening, if multiple openings are used) is located closer to the inflator side 100*d* of the airbag than a location 100*h* (residing a predetermined distance 100*f* along the a surface of the divider 100 from the inflator side 100*d*), the movements of the components of the valve mechanism 112 may be constricted by proximity to the instrument panel profile (as denoted by line 212 in FIG. 12A), thereby impairing valve operation. Thus, between locations 100*h* and 100*j* along a surface of the divider is an interval or zone in which the opening or openings 200 should be positioned to achieve adequate gas flow to fill the lower chamber.

While positioning of the leading edge(s) 200*a* past the distance D1 and farther away from the front portion of the main panel 12 eliminates excessive downward pull of the airbag during the initial stages of inflation, thereby improving the overall performance of the bag with respect to an adult occupant, this positioning of the opening(s) may result in less-than-optimum performance for Out of Position-1 children. There is a balance between these requirements which may be tuned for a specific vehicle or specific application in order to achieve the best overall performance both early and later in the deployment event, and for both types of passenger. Between locations 100*h* and 100*a* lie an optimal location or locations for tuning the initial cushion fill and cushion pitch to achieve the desired results for a given application. The exact desired location of the opening (or openings) 200 for a particular application may be determined iteratively, by experimentation, or analytically.

In particular embodiments of the airbag, it is desired to position the opening(s) 200 along the divider 100 so that, during inflation, the airbag 10 reacts with a child passenger in a predetermined manner. More specifically, the opening(s) 200 are positioned along the divider such that, as the upper chamber fills in the initial stage of deployment, the bag upper chamber 102 inflates above the top of the head 700*a* of a Hybrid III 3 and 6-Year Old ATD (generally designated 700) when the head is positioned resting against or proximate the vehicle instrument panel at a location specified as Position-2 for NHTSA Out of Position (OOP) testing in accordance with FMVSS Standard No. 208 (which may be found, for example, at http://www.law.cornell.edu/cfr/text/49/571.208), which is incorporated herein by reference in its entirety. The Hybrid III 3 and 6-Year Old test dummy has physical parameters defined by the National Highway Traffic Safety Administration at http://www.nhtsa.gov/Research/HYBRID+III+6-Year+ Old+Physical+Data, the contents of which is incorporated by reference in its entirety Position-2 for Out of Position testing is also shown in FIG. 5 of the reference available at http://www.nhtsa.gov/cars/rules/rulings/80g/80giii.html, the substance of which is repeated in this application as FIG. 14.

As gases flow into the lower chamber 104 from the upper chamber 102, the lower chamber 104 inflates in the later stages of deployment so as to occupy a space behind and around the child's head, thereby preventing and/or mitigating harmful interactions between the airbag and the child's head. This inflation progression is shown in FIGS. 12 and 13, with the circle 700 representing a 3 or 6-year-old ATD, and the portion of the circle labeled 700*a* representing the top of the head of the ATD.

The values of D1, 100*f* and other valve positioning parameters are determined as a function of the vehicle interior dimensions and the placement of the out-of-position-2 child, according to the previously mention NHTSA standards. Practical limitations of the valve placement affect the airbag performance for an out-of-position 3-year old or 6-year old child, as defined by NHTSA FMVSS Standard No. 208, incorporated herein by reference in its entirety. By positioning the opening(s) 200 within the range defined by locations 100*h* and 100*j* (i.e., zone Z3) in FIGS. 12A and 12B, the forces exerted by the airbag on both the 3-year old and 6-year old child in Position-1 (shown in FIG. 20) will be distributed between the child's head and thorax regions. For example, it has been found that when the opening(s) 200 are positioned within a distance D1 along the divider from a seam connecting the divider 100 with the occupant side of the airbag, the airbag will tend to impact the child when deployed, before completely filling. This contact with the child tends reduce the flow rate of gases into the lower chamber, which reduces the forces acting on the child. Also, it has been found that when the opening(s) 200 are positioned within a predetermined distance (100*f*) along the divider from an inflator side (100*d*) of the airbag toward an occupant side of the airbag, the airbag will tend to impact the child when deployed, before completely filling, with the results previously mentioned.

Figure 16:
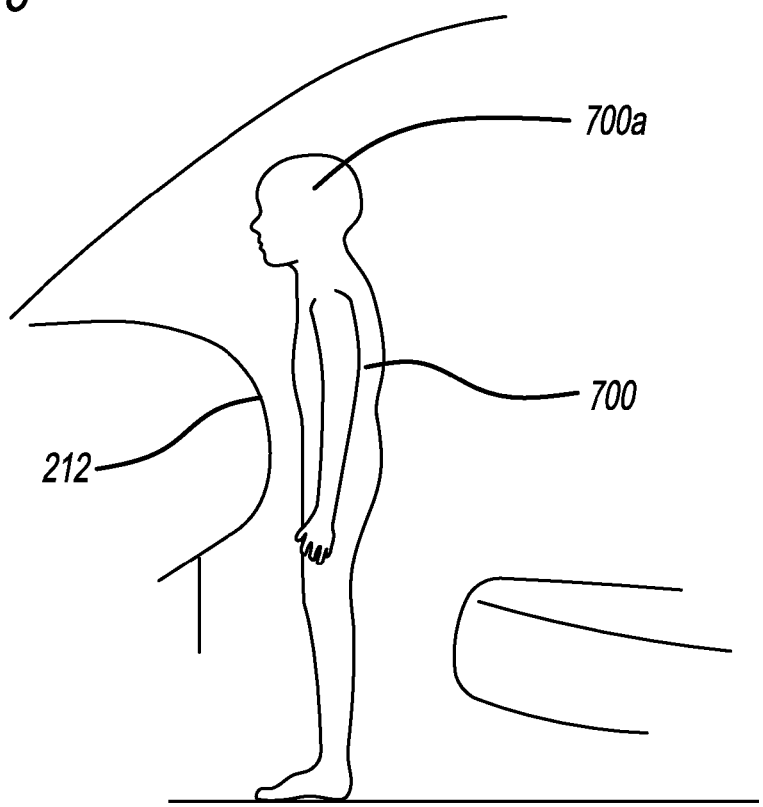
FIG. 16 is a side view of a 3 year-old Anthropomorphic Test Device positioned in Position-1 for NHTSA Out of Position testing under FMVSS Standard No. 208, prior to activation of a vehicle airbag.
Figure 17:
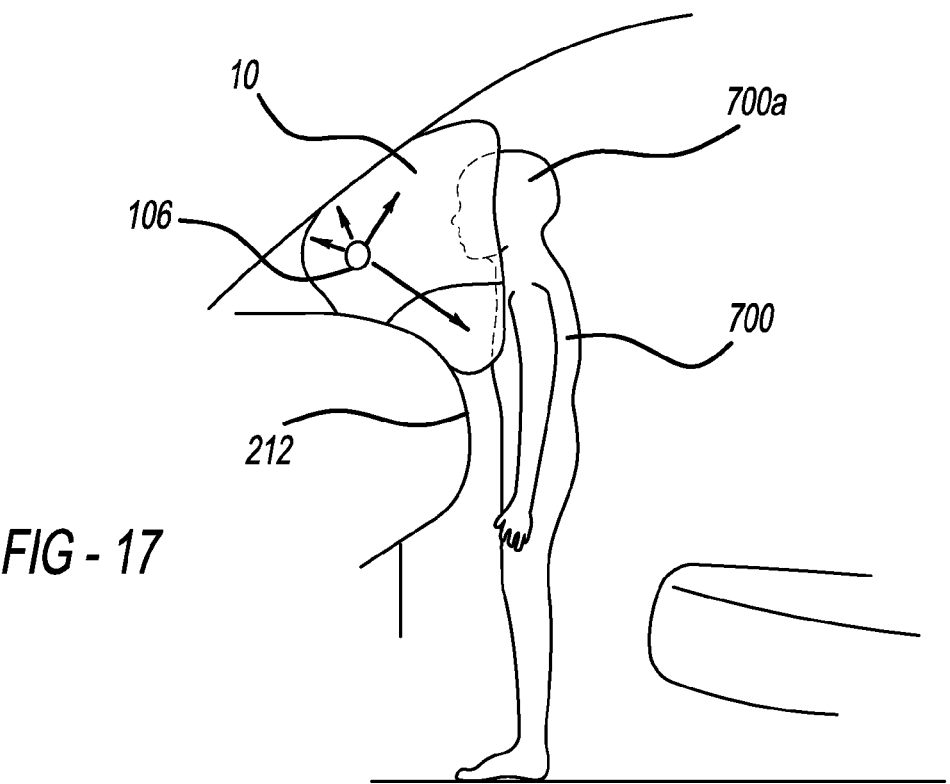
FIG. 17 is the side view of FIG. 16 after activation of a vehicle airbag.

In contrast, referring to FIGS. 16 and 17 (which show a 3 year-old Anthropomorphic Test Device positioned in Position-1 for NHTSA Out of Position testing), it has been found that when the opening(s) 200 are positioned within zone Z3 as described herein, the gases are permitted to flow into the lower chamber without obstruction. This creates a more evenly distributed loading on the child's head and thoracic regions. Also, with this placement of the valve, the gases can more easily flow out of the vents 106 from the upper chamber.

Figure 12B:
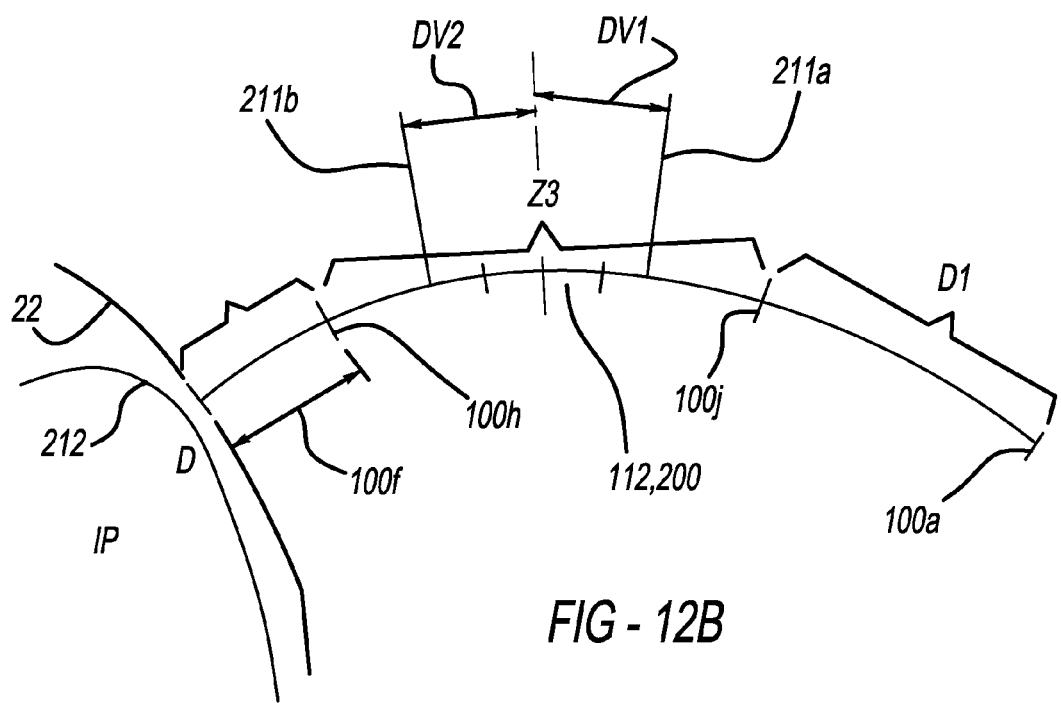
FIG. 12B is a magnified view of a portion of the cross-sectional side view shown in FIG. 12A.

It has been found that an optimum inflation profile range and alignment with the passenger's body as shown in FIG. 4, as well as the bag inflation progression shown in FIGS. 12-13, can be achieved by positioning all divider openings 200 such that all edges of the openings reside within the zone bounded by or residing between locations 100*h* and 100*j* in FIG. 12A, which may also be defined on one side by a vertical plane P1 shown in FIG. 12 corresponding to location 100*h* in FIG. 12*b* abutting the front-most portion of the head of the Hybrid III 6-Year Old Anthropomorphic Test Device (ATD) when the head of the Hybrid III 6-year old is in Position-2 for NHTSA Out of Position testing as specified above, and on an opposite side by a vertical plane P2 (see FIG. 12) passing through location 100J shown in FIG. 12*b*. As known in the pertinent art, an anthropomorphic test device is a human form in shape, mass and mechanical response, equipped with sensors including accelerometers, deflection sensors and other measurement devices, to simulate the performance of the human body. It is used in the assessment of injury potential in vehicle safety testing. In one embodiment, plane P2 is spaced apart approximately 7 inches from plane P1 toward a rear of the vehicle when the airbag is inflated. This effectively positions the divider opening(s) within a zone enclosing the head of the Hybrid III 6-Year Old ATD. The distance between planes P1 and P2 defines a zone Z3 in which the openings 200 may be positioned. For example, FIG. 11 is a plan view of an uninflated airbag showing an embodiment of the airbag divider 100 having a circular opening 200 positioned such that the rear-most edge of the opening resides within the specified zone Z3 when the bag is inflated.

It has also been found that a total area of the opening (or openings) 200 within a range of 700 square millimeters (achievable using, for example, one opening of approximately 15 mm radius) to 32,000 square millimeters (achievable using, for example, one opening of approximately 100 mm radius opening) is desirable for helping to ensure that airbag performance is within an optimum range. In embodiments of the present invention, which use a directional valve mechanism to facilitate inflow and restrict backflow from the lower chamber to the upper chamber as previously described, the areas of the divider opening or openings may need to be at or near an upper end of this range of opening sizes 700 to 32,000 square millimeters, to provide the necessary inflation profile given the reduction in flow caused by turbulence and friction in the gases as they flow through the opening(s) and interact with the portions of the valve.

In one embodiment, the opening or openings 200 are circular. However, the opening(s) can have any desired shape, as long as the total area of the opening(s) is within the range specified above, and as long as all of the opening edges are positioned within the zone defined above.

In addition, the number of openings 200 and the optimum size(s) of the opening(s) formed in divider 100 for a particular application may be determined based on the type of vehicle collision pulse and interior geometry of the vehicle in which the airbag is installed, the desired fill rate of the airbag, the volume ratio, the type of directional valve used, the overall dimensions and curvature of the instrument panel, and other pertinent factors. The size(s) and position(s) of the opening(s) 200 as described herein facilitate smooth and rapid transfer of inflation gases from the upper chamber to the lower chamber during initial stages of airbag filling. Once equilibrium is substantially reached between the upper and lower chamber pressures, flow from one chamber to the other is reduced. As the occupant begins to load the lower chamber of the cushion, the pressure within the lower chamber increases, causing the operating member of the valve to restrict the backflow of gas from the lower chamber to the upper chamber. This restricted flow now is effectively absorbing energy from the occupant interaction with the bag lower chamber. The flow restriction can also be adjusted or tuned in order to absorb the occupant energy as required for a particular application. The flow restriction valve 112 controlling flow between the upper and lower chambers can have a single operating member which provides both a desired inflow (to the lower chamber) and a desired backflow (back from the lower chamber) characteristic, or the valve can have one operating member for controlling inflow and another operating member to control outflow from the lower chamber. In the later phases of the occupant loading of the cushion, backflow from the lower chamber goes into the upper chamber and then the gas is discharged from the upper chamber into the environment through the main vents 106 located in the wall of the upper chamber.

In an embodiment where multiple valves are incorporated into or coupled to divider 100 to increase gas flow into lower chamber 104, all of the valves need not be positioned within zone Z3. However, it is desirable to position any additional valves within zone Z3 rather than within the distance D1 from divider leading edge 100a.

In the case of an Out of Position child in accordance with the NHTSA Position-2 testing standard, the initial stages of the cushion deployment development remains the same as described above. However, the gas flow between the upper and lower chambers as regulated by the divider valve mechanism is different when a child interacts with the cushion. In the case of the Out of Position-2 child, the volume of the lower chamber is decreased due to the space occupied by the Out of Position Child. The divider valve mechanism continues to permit the flow of gases from the upper chamber into the lower chamber. However, the valve mechanism also allows the gas to continue to flow into the lower chamber until the cushion's lower chamber and upper chamber internal pressures are in equilibrium, thereby stabilizing the interaction between the cushion and the out of position child. The divider valve mechanism 112 and cushion main vent designs are structured to facilitate rapid transition of this state of equilibrium into an adaptive state, wherein the cushion changes from a state of gas flow into the lower chamber to a state where the gas flow is increased out of the main vents (located in wall(s) of the upper chamber) into the environment. This increased flow out of the cushion allows for decreased pressure within the upper chamber and then allows for the backflow of gases from the lower chamber back into the upper chamber and out of the main vents into the environment. This adaptability of the valve mechanism 112 to regulate the flow communication between the two chambers is important for the protection of adult and child occupants.

In particular embodiments of the present invention described herein, the various airbag elements are shaped and connected to each other so that, when fully inflated, the front side 20 of the bag aids in maintaining alignment of the head, neck, and thoracic body regions along a line L as shown in FIG. 4 during early occupant interaction with the airbag, wherein the upper body portion of the occupant pivots forward from the hip point 202 along line L. As the occupant contacts the bag, it is desirable to maintain the alignment of the head and thorax regions and balance the energy absorption by the bag from the head and the thorax, to minimize the relative motion at the neck. As seen in FIG. 4, the bag is structured such that the portions of the upper and lower chambers of the cushion facing the occupant 20 form an essentially flat plane, indicated by the line P in the drawing. At the early stages of airbag inflation, the occupant seatbelt (not shown) tensions to restrain the occupant's lower thoracic region in the seat. Thus, the hip point 202 resides at a first location H1. At a later stage of inflation, the restraining force limit of the seatbelt webbing is exceeded by the forces exerted by the accelerating passenger, thereby permitting the hip point 202 to shift from location H1 to a second location H2, closer to or lying on plane P. Thus, during the later stages of inflation, due to movement of the occupant, the line L approaches or lies along plane P.

It has been found that passenger-side airbags structured as described above, are especially effective in providing optimal cushion performance for various sizes of adults and also for achieving low risk deployment performance specifications for 3 & 6 year old ATDs, as specified in the safety regulations previously mentioned. The proportioning of the pressures in the upper and lower chambers as previously described, in conjunction with the bag structure previously described, enable the airbag chamber surfaces to absorb energy responsive to interaction with both the heavier thorax and the smaller and lighter head region, so as to help maintain body alignment along line L (FIG. 4) during contact between the passenger and the airbag. Particularly from the perspective of the adult $5^{th}$ female and adult $50^{th}$ male, optimum airbag performance is provided by maintaining, to the greatest degree possible, both of these body regions in line with respect to one another, while enabling the upper body as a whole to pivot at the hip axis.

In yet another aspect of the invention, and as shown in FIGS. 5-10, a volume control mechanism (VCM) or internal tether 211 is provided to control the gaseous volume distribution upon airbag deployment. In the embodiment shown in FIGS. 5-10, the VCM includes a first or front tethering mechanism 211a, a second or rear tethering mechanism 211b, and a connecting portion 211c connecting the first and second tethering mechanisms. A first end 213 of the volume control mechanism 211 is attached to the inner upper surface 12a of the airbag panel 12 along a first connection seam 12b relatively closer to the airbag front side 20. From the first end 213, a front tethering mechanism 211a of the VCM 211 extends downwardly toward the leading edge 100a of the divider 100 and is fixed to divider 100 along a seam 100e between the opening 200 and the divider leading edge 100a. Another portion 211c of the VCM 211 then continues along the divider 100 being generally disposed above the opening 200 and valve 112 and toward the airbag inflation side 22, and is then fixed to the divider along a seam 100f between the opening 200 and the rear 22. Portion 211c has an opening 211d incorporated therein to permit passage of gases through portion 211c to the valve 112 and associated divider opening 200, then through the valve and into lower chamber 104. Referring to FIG. 9, either of a distance DV1 from a center of the opening in the valve 112 connecting the upper and lower chambers to the connection seam 100e, and a distance DV2 from a center of the opening in the valve 112 connecting the upper and lower chambers to connection seam 100f, may preferably range from 100 to 250 millimeters (mm), inclusive. In general, the distances DV1 and DV2 are defined by tests iteratively calculated based on the head location of the "six-year old" ATD upon airbag actuation. Aft or rear tethering mechanism 211b of the VCM 211 then extends from the divider 100 upwardly back toward the main panel 12 and is fixed at a second end 215 of the VCM 211 to the upper inner surface 12c of panel 12 along a connection seam 12d. It will be appreciated that the length L1 of front tethering mechanism 211a extending between divider 100 and main panel 12, and the length L2 of rear tethering mechanism 211b extending between divider 100 and main panel 12, may be preferably sized to be about 80 mm to 350 mm, depending on the location of the attachment seams 12b and 12d. The lengths of the various portions of the VCM 211 may for example, be defined by the vehicle windshield height and the Out of Position Height of the six year old "child's" head when evaluating the airbag performance after actuation Although the valve 112 shown in the embodiment of FIG. 9 is located below tether portion 211c, valve 112 and divider opening (or openings) 200 enabling fluid communication between chambers may be positioned at any location within the zone Z3 as previously described.

Figure 14:
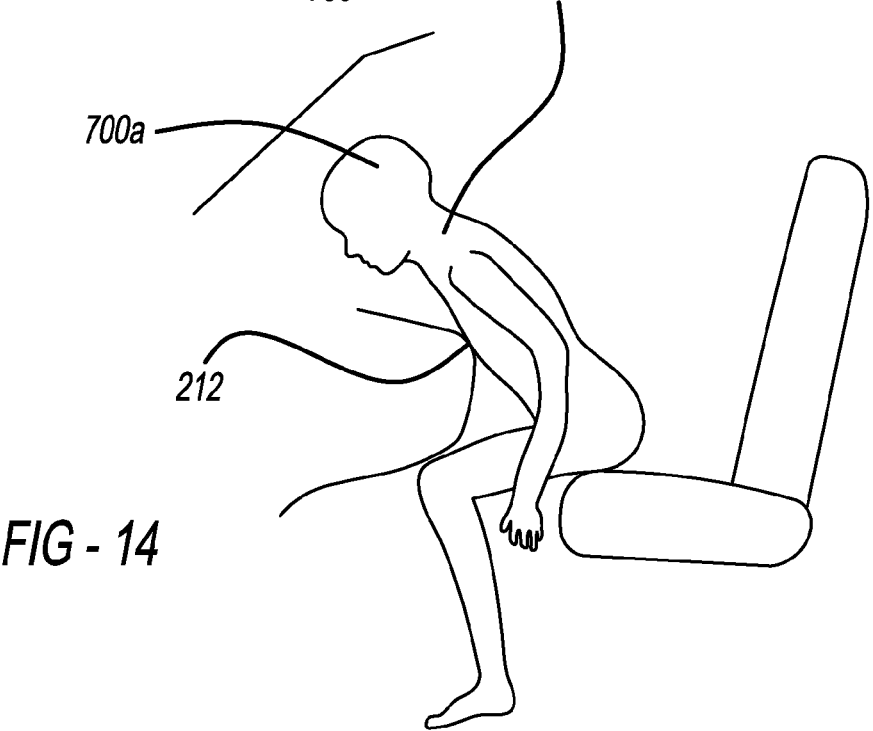
FIG. 14 is a schematic view of an Anthropomorphic Test Device (ATD) positioned in Position-2 for NHTSA Out of Position testing under FMVSS Standard No. 208.

Referring to FIGS. 12-14, embodiments of the tethering mechanisms described herein are structured and attached to the divider 100 and outer airbag panel 12 so as to control or constrain movement of the divider during airbag inflation, to prevent the divider from exerting pressure on the head and neck of a 3 year-old Anthropomorphic Test Device positioned in Position-2 for NHTSA Out of Position testing under FMVSS Standard No. 208 (FIG. 14) during inflation. More specifically, these tethering mechanism embodiments prevent the attached portions of the divider from moving or deflecting downward far enough to exert pressure the child's head during inflation of the upper chamber. Thus, the tether 211 limits deflection of the divider 100 in a direction toward lower chamber 104 during inflation of the airbag. As a result of the constraints imposed by the tethering mechanisms on the divider, gas flows into the upper chamber 102 and the airbag moves away from the instrument panel 212 above the head of the out-of-position child as the airbag deploys, and the airbag expands over the top of the child's head as the upper chamber fills.

As the upper chamber 102 fills, its volume eventually becomes constrained by the tether mechanisms 211a and 211b of the VCM, which limit movement of portions of divider 100 attached to the tether toward lower chamber 104, and prevent the divider from exerting pressure on the child's head and neck. Filling of the upper chamber to its available volume as constrained by the VCM causes a rapid increase in the filling of the lower chamber, which expands behind and around the head of the out-of-position child, as shown in FIG. 13.

In addition, with regard to adult occupants, by restricting movement of the divider downward and into the lower chamber, the tethering mechanisms (as well as controlling the volume of the upper chamber) also direct the expansion trajectory of the upper chamber away from the instrument panel. This results in a lower fill time and produces an earlier contact with the head of the adult occupant. This further aids in reducing potential injury to the occupant by providing support to the otherwise unrestrained head and neck. Thus, the VCM enables control of the upper chamber volume to achieve a value within a predetermined range.

In addition, as the upper chamber volume is controlled, the lower chamber volume is also controlled. For example, for an airbag of a given overall internal volume, limiting the upper chamber to a relatively smaller volume by preventing deflection of the divider toward the lower chamber will correspondingly increase the inflated volume of the lower chamber, thereby increasing the energy absorption capability of the lower chamber. Thus, this ability to "tune" or adjust the inflated volume of each chamber by adjusting the attachment points and lengths of the tether mechanisms of the VCM enables the energy absorption capability of each chamber to be more precisely adjusted according to the requirements of a particular application.

The lengths and attachment locations of the portions of the tether 211 to the panel 12 and the divider 100 needed to meet the requirements of a particular application for can be calculated and/or iteratively determined by testing.

Although the embodiments of the VCM shown herein are positioned in the upper chamber 102, in alternative embodiments, a VCM as described herein may be positioned within the lower chamber 104 and attached to a lower face of the divider, so as to restrict deflection or motion of the divider in a direction toward the upper chamber 102, in the same manner as described for the VCM positioned in the upper chamber. This would, for example, restrict deflection of the divider during backflow of gases from the lower chamber to the upper chamber. Thus, in general, a VCM may be positioned in one of the airbag chambers formed by the divider to restrict deflection of the divider in a direction toward another chamber formed by the divider.

The VCM 211 may be formed from the same fabric or material used in manufacturing the airbag. For example, U.S. Pat. Nos. 6,458,725 and 6,886,857, herein incorporated by reference in their entirety, teach various materials useful in manufacturing airbags. Additionally, U.S. Pat. Nos. 8,128,124, 7,857,347, and 8,322,748, herein incorporated by reference in their entirety, describe the structure and various aspects of manufacturing of various airbags, which may be advantageously utilized in the present invention to form the present airbags.

Referring to FIG. 10, the tether or VCM 211 shown in FIGS. 5-10 has a total length LT. In the embodiment shown in FIGS. 5-10, VCM 211 has a body 211z with a pair of opposed ends 213 and 215 and a pair of opposed side edges 211s and 211r extending between the first and second ends. A width of end 213 is W1 and a width of end 215 is W2. The body is attached to the divider 100 along a first divider seam 100e and along a second divider seam 100f extending between the side edges.

In the embodiment shown, the tether width is uniform. However, the VCM 211 may vary in width and length depending on the particular volumetric progression desired. If desired for certain applications, the width W may also vary along the length of the tether. For example, width W1 may be different from width W2. In other examples, rather than increasing or decreasing in width in a constant manner along the length LT, the tether width may vary along the length in any manner needed to achieve a desired airbag internal pressure of fill effect.

Figure 23A:
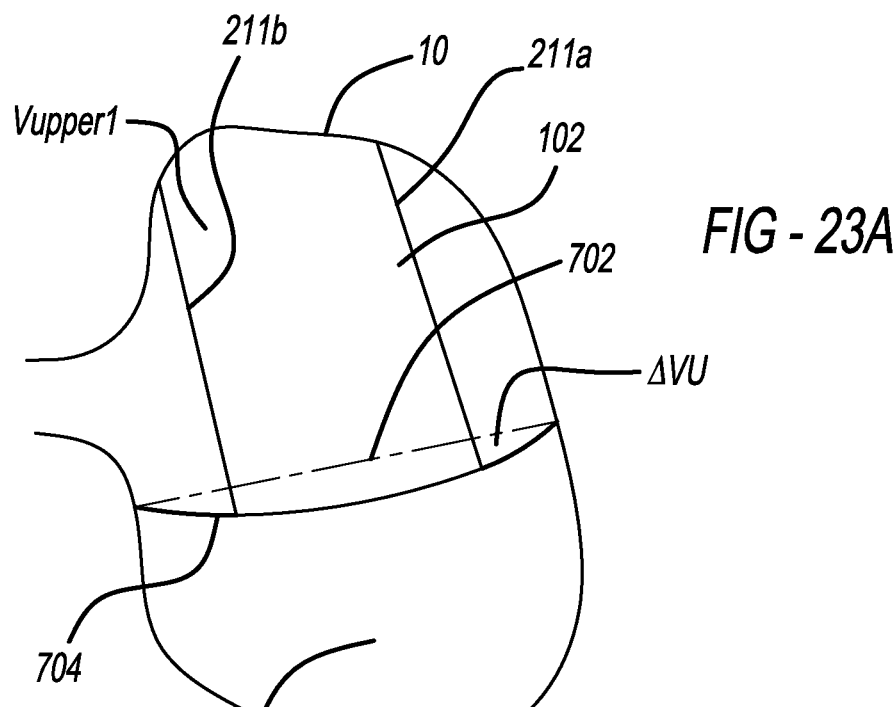
FIGS. 23A and 23B are schematic cross-sectional side views of an airbag in accordance with an embodiment described herein, showing a portion of the airbag interior volume shared by the upper and lower chambers when the bag is inflated.
Figure 23B:
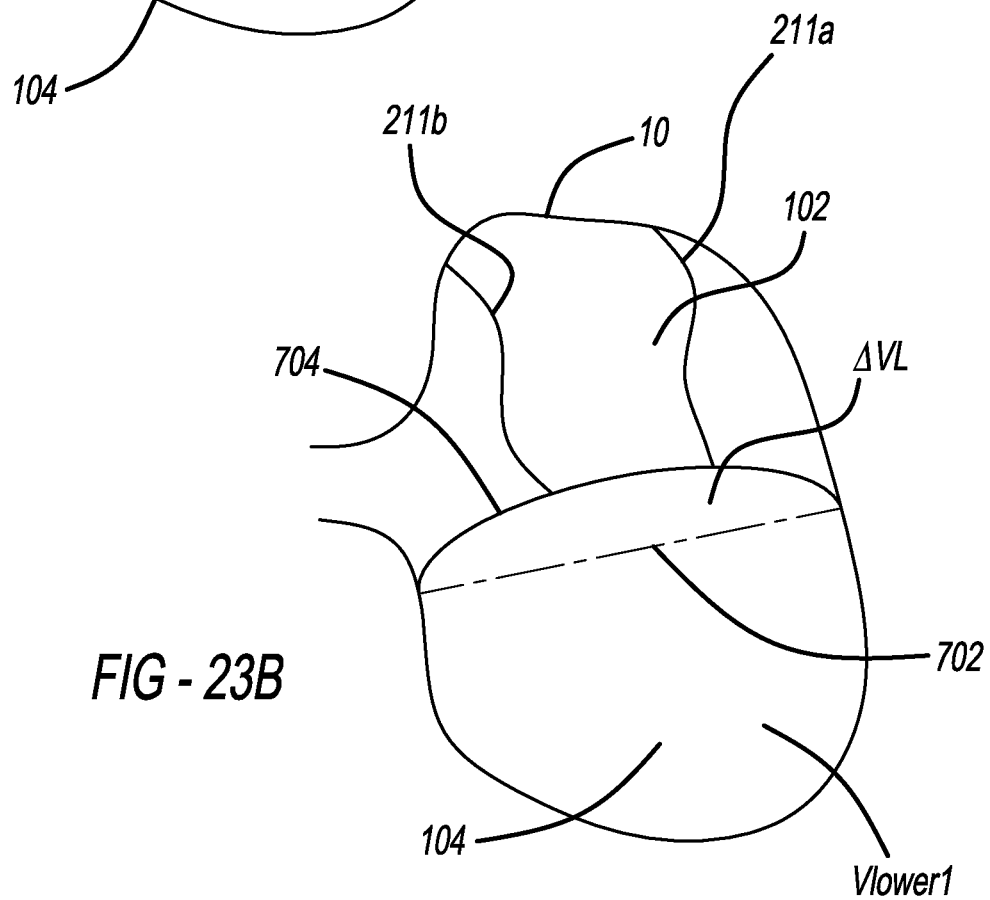

Referring to FIGS. 23A and 23B, in a particular embodiment, it is seen that the inflated upper chamber volume $V_{upper}$ includes both a $V_{upper1}$ (as measured when the upper and lower chambers have the same internal pressures, represented as divider configuration 702 in FIG. 23A) and an additional volume $\Delta VU$, which is the difference between $V_{upper1}$ and the expanded upper chamber volume (represented as divider configuration 704 in FIG. 23A) produced when a pressure differential between the chambers causes a net deflection of the divider 100 toward lower chamber 104 (FIG. 23A). It is also seen that the inflated lower chamber volume $V_{lower}$ includes both a $V_{lower1}$ (as measured when the upper and lower chambers have the same internal pressures, represented as divider configuration 702 in FIG. 23B) and an additional volume $\Delta VL$, which is the difference between $V_{lower1}$ and the expanded lower chamber volume (represented as divider configuration 706 in FIG. 23B) produced when a pressure differential between the chambers causes a net deflection of the divider 100 toward upper chamber 102 (FIG. 23B). The VCM 211 may be attached to the divider 100 and to the panels defining the airbag so as to limit the sum ($\Delta VL+\Delta VU$) to a maximum of 15% of the total internal volume of the airbag in a fully inflated condition without the divider attached. The sum ($\Delta VL+\Delta VU$) defined a shared volume of the airbag interior, as it is the total volume residing between the divider 100 when stretched or deflected to a maximum allowable value toward the lower chamber, and the divider when stretched or deflected to a maximum allowable value toward the upper chamber. Thus, the shared volume is the total volume shared by both the upper and lower chambers. Because the volume of upper chamber 102 is restricted by the VCM as described herein, $\Delta VU$ will generally be less than $\Delta VL$.

In one embodiment, shown in FIGS. 5-10, VCM 211 is structured and attached to the divider 100 and to panel 12 so as to effectively partition the upper chamber 102 into a plurality of adjacent regions or sub-chambers 1-4 (as shown in FIG. 6). In an embodiment incorporating multiple sub-chambers, portions of the VCM 211 may be widened to attenuate the dispersal of the gas around the tether and through the valve 112. The VCM 211 may also, in addition to a desired width or as an alternative design, contain one or more perforations that provide for a designed gas and volume release through the valve 112. In addition, one or more openings may be provided in one or more of tethering mechanisms 211a, 211b, and 211c to direct gas flow in one or more preferred directions or to otherwise further modify the airbag inflation profile during inflation of the airbag. For example, one or more openings can be provided in tethering mechanism 211b to facilitate gas flow from sub-chamber 3 into adjacent sub-chamber 2. In addition (or alternatively), one or more openings fan be provided in tethering mechanism 211a to facilitate gas flow from sub-chamber 1 into adjacent chamber 1. The flowrate(s) of gases through any openings provided in tether mechanisms 211a and 211b may be tailored to the requirements of a particular application by adjusting the number and/or size(s) of the openings. For example, the gas flow rate between adjacent sub-chambers can be increased by increasing the number of openings or the total cross-sectional area of the opening(s) formed in the tether mechanism separating the adjacent sub-chambers. Conversely, the gas flow rate between adjacent sub-chambers can be decreased by decreasing the number of openings or the total cross-sectional area of the opening(s) formed in the tether mechanism separating the adjacent sub-chambers. In addition, the position or positions of the openings provided in the tether mechanisms 211a and 211b can be adjusted to aid in producing a desired airbag inflation response.

It will be appreciated that when integrating a known inflator having a particular gas (mols) output over time, the desired pressure of the upper chamber and the desired pressure of the lower chamber over time (or pressure gradient) can be determined based on the effective volume resulting from iteratively varying the width, length, or perforations in the VCM 211, for example.

In the embodiment shown in FIGS. 5-10, VCM 211 is attached to divider 100 along two seams 100e and 100f (which may extend between the side edges 211s and 211r) and to panel 12 so as to form three tether portions, 211a, 211b and 211c constraining movement of portions of the divider. However, the VCM may be attached to the divider and panel so as to form any desired number of constraining tether portions, to aid in achieving a desired contour of the divider and to aid in prioritizing the order of inflation and/or pressurization rate of selected portions of the airbag, to meet the requirements of a particular application. For example, in one particular embodiment, a tether is attached at one end thereof to the divider 100 along a divider seam (which may extend between the side edges 211s and 211r), and at the other end thereof to the panel 12 along a panel seam, thereby connecting the divider and the panel 12 with a single tether mechanism rather than with multiple, interconnected tether mechanisms. In another embodiment, multiple tether mechanisms may connect the panel 12 to the divider, where each tether mechanism has one end attached to the divider 100 and one end attached to the panel 12. In addition, combinations of types of tethers may be used, including one or more tethers which are attached to the divider 100 and the panel 12 so as to be segmented as shown in FIGS. 5-10, and one or more tethers having opposite ends thereof attached to respective ones of the panel 12 and divider 100, as just described.

In another particular embodiment, a leading edge 110a of the divider 100 is attached to a front side 20 of the airbag along a seam structured to reside below a neck region of a passenger contacting the front side during inflation of the airbag, and the divider seam 100e attaching the tether 211 to the divider extends along the divider leading edge 110a.

The VCM 211 thereby decreases or increases the chamber volume by controlling the downward deflection of the dividing panel 100 upon actuation of the airbag and the onset of airbag pressure, either by limiting the downward deflection, or by increasing the downward deflection of the dividing panel 100, respectively. Accordingly, increasing the width of the VCM 211 introduces an upper chamber pressure gradient and provides relatively higher cushion trajectory, a stiffer cushion region, and a reduced flow rate to subsequent sub-chambers in the gas flow. On the other hand, decreasing the width of the VCM 211 produces a relative decrease in the upper chamber pressure gradient, provides a lower cushion trajectory, provides a softer cushion region, and a relatively smooth gas transfer into subsequent chambers. For example, in the embodiment shown in FIG. 9, if tether mechanism 211b has a first width w and tether mechanism 211a has a second width w+x (so that 211a is wider than 211b), gas flow into sub-chamber 1 (FIG. 6) will be impeded, thereby increasing the pressure in sub-chamber 2. This increases gas flow into sub-chamber 4.

In the manner described above, the upper chamber can be divided into sub-chambers as previously described, with the pressure in a first sub-chamber being different from the pressure in a second, adjacent sub-chamber. In this manner, the overall pressure gradient of the upper chamber can be varied or "tuned" according to the location within the upper chamber.

In addition, by varying the tether width as described above, the fill rate of the portion of the upper chamber interacting with the head and neck regions of the occupant or ATD (shown as sub-chamber 1 in FIG. 6) can be controlled. In this manner, the stiffness or level of support to the head and neck regions and also the speed at which the desired level of support is achieved can be varied according to the requirements of a particular application.

In the same way, the length of the VCM 211 may be decreased to decrease the relative upper chamber volume, increase the relative upper chamber pressure, provide a higher cushion trajectory, and a relatively stiffer cushion region. On the other hand, the length of the VCM 211 may be increased to increase the relative upper chamber volume, reduce the relative upper chamber pressure, provide a lower cushion trajectory, and a relatively softer cushion region.

Yet another way to tailor the airbag performance includes tailoring the upper chamber tether attachment zone, again affecting the variables described above, such as the pressure gradient within the upper chamber.

In yet another aspect of the invention and as shown in FIG. 6 below, an actuated airbag 10 of the present invention has four relative chambers based on the progressive pressurization of each chamber over time. Referring to FIG. 6, upon deployment of the airbag, gases first enter region three. Depending on the width of the tether the gases are directed outwardly around the tethering/diffuser mechanism or VCM 211. As the pressure within region 3 is increased, an upward momentum on the tethering mechanism is created. The upward momentum of region three results in the relatively uninflated lower chamber (region 4) being brought up over an out-of-position child's head, prior to being pressurized. Gases from region 3 are pushed radially outwardly creating a "pocket effect". The gases then transfer to region 2 where, by iteratively determining the size (width and/or length) of the front tethering mechanism 211a, gas flow into regions 1 and 4 may be adjusted. It has been found that the wider the tethering mechanism 211, and the slower the gas flow rate from chamber 3 into adjacent chambers 2 and 1, and the quicker the fill rate of the lower chamber of region 4. Conversely, it has also been found that the smaller the width of the tethering mechanism 211, the faster the more forward regions 1 and 2 are pressurized, while the lower chamber region 4 is pressurized relatively more slowly. It is believed that the reduction in the width of the tether 211 facilitates gas flow from chamber 3 to chambers 1 and 2 by increasing the areas of the flow passages defined between the tether 211 and each of the opposite walls 14 and 16 of the airbag. Accordingly, the width of the VCM 211 may be designed to create a desired pressure gradient of regions 1-4, whereby the lower and upper chambers may be tuned to a pressure gradient given the particular design requirements.

In general, then, it has been found that the tether width can be "tuned" or adjusted to increase or decrease pressure in regions 1-3. The width of tethers generally ranges from about 50 mm to a width that spans substantially across the interior of the cushion thereby facilitating the increase or decrease of flow rates as desired. Stated another way, as the width of the tether is increased, the pressure is relatively increased because of the decreased area for inflator gases to go into subsequent chambers. When the tether or VCM 211 width extends across the cushion 10, the regulation of gas flow from the first region shown in FIG. 6 may be facilitated by iteratively designing the tether with perforations to tailor the pressure gradient between the various regions 1-4.

The tether configuration and attachment options described herein facilitate the provision of a desired airbag inflation response, while still enabling control of the configuration or contour shape of the divider, both during airbag inflation and after full bag inflation has been achieved.

Referring to FIG. 7, In one embodiment, the VCM 211 may be generally attached along seams 12b and 12d along the upper surfaces 12a and 12c, whereby these attachment seams may be generally defined as preferably occurring within a zone D2−D1=d located from 100 mm (at D1) to 800 mm (at D2) from the inflator 990 (within the instrument panel) inclusive, along the inner and outer upper cushion surfaces 12a or 12c, respectively.

As shown in FIGS. 8 and 9, the VCM upper attachment seams 12b and 12d may be provided at a distance relatively closer to the inflator. In a particular embodiment, for example, it may be that the attachment seams 12b and 12d are generally provided within a range d of 300 mm (at D1) to 500 mm (at D2) from the inflator position, along the inner and outer upper cushion surfaces 12a or 12c. The result is that the airbag 10 exhibits reduced outward (or frontal) loading, thereby producing less of a downward movement of the airbag as it contours about the instrument panel. Stated another way, the airbag 10 is more rearwardly oriented toward the instrument panel.

On the other hand, again referring to FIG. 8, the front tethering mechanism 211a may be attached at a seam 12b relatively closer to the 800 mm distance from the inflator, and the rear tethering mechanism 211b may be attached at a seam 12d around 400 mm from the inflator. As a result of this location of both of seams 12b and 12d relatively farther toward the front of the airbag, the airbag 10 when deployed exhibits a greater outward loading, thereby producing a greater downward movement about the contour of the instrument panel, whereby the frontal wall 20 is relatively further away from the instrument panel than as compared to the embodiment shown in FIG. 8.

Operation of an airbag in accordance with an embodiment of the invention, and movement of the vehicle occupant's body prior to and during contact with a deployed airbag, are illustrated in FIG. 4.

Prior to bag deployment, airbag 10 is operatively coupled to an associated gas generating system or other inflation fluid source (not shown), in a manner known in the art. The inflation fluid source may be operatively coupled to a collision event sensor (not shown) that includes (or is in operative communication with) a controller (not shown) which signals activation of the airbag system in the event of a collision.

When the system is activated, and prior to a passenger contacting the airbag, inflation fluid flows from the fluid source into upper chamber 102, rapidly inflating the upper chamber. Inflation fluid then flows through opening 200 and associated valve 112 into lower chamber 104. In addition, when the lower chamber is filled, valve 112 restricts gas backflow responsive to pressure in lower chamber 104 to restrict the flow of gas back into the upper chamber 102. Thus, the entire bag is fully inflated while the passenger is moving forward and prior to contact with the passenger.

As the passenger contacts the airbag, gases in the upper camber are vented to the lower chamber 104 through valve 112 and to the bag exterior through the upper chamber vents 106, resulting in a reduction of upper chamber pressure and a "softening" of bag front surface over the upper chamber responsive to contact with the passenger's head and neck regions. This softening aids in providing sufficient support to protect the occupant's head and neck region, while helping to minimize the contact forces between the head/neck region and the airbag. However, because of valve 112, the lower chamber pressure is maintained at a relatively high level, thereby maintaining the firmness of the bag surfaces exterior of the lower chamber in response to contact with the occupant's thorax to provide supplemental restraint in conjunction with the seatbelt system. This facilitates pivoting of the passenger's upper body about the hip axis. The airbag proceeds to deflate and deflect uniformly so as to preserve this alignment while the passenger is in contact with the airbag.

Figure 15:
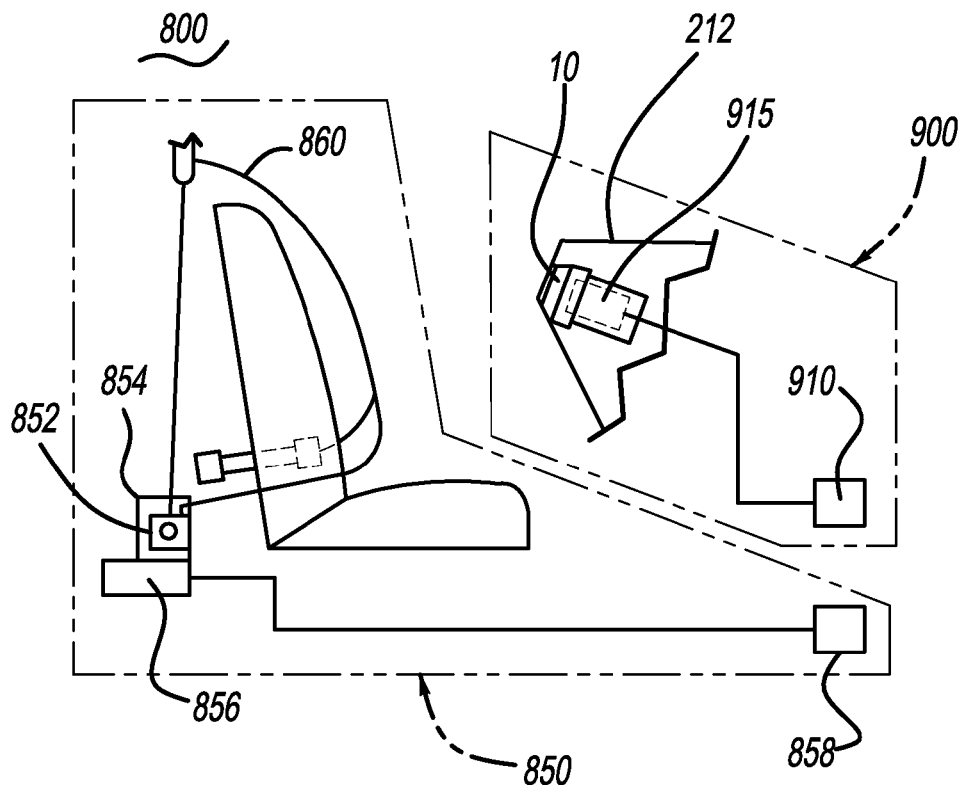
FIG. 15 is a schematic view of a vehicle occupant protection system incorporating an airbag in accordance with an embodiment of the present invention.

Referring now to FIG. 15, an embodiment 10 of the airbag described herein may be incorporated into an airbag system 900. Airbag system 900 includes at least one gas source 915 (for example, a known inflator or gas generating system) and airbag 10 in accordance with an embodiment described herein. The airbag is operatively coupled to the gas source so as to enable fluid communication therewith upon activation of the gas generating system. Airbag system 900 may also include (or be in communication with) a collision event sensor 910. Collision event sensor 910 includes a known collision sensor algorithm that prompts actuation of airbag system 900 via, for example, activation of gas source 915 in the event of a collision.

Referring again to FIG. 15, airbag system 900 may also be incorporated into a broader, more comprehensive vehicle occupant protection system 800 including additional elements such as a safety belt assembly 850. FIG. 15 shows a schematic diagram of one exemplary embodiment of such a protection system. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a known safety belt pretensioner 856 may be coupled to belt retractor mechanism 854 to actuate the retractor mechanism in the event of a collision. Additionally, the safety belt assembly may also incorporate an energy-management feature with a load limiter which may be tuned or adjusted to operate in conjunction with the airbag system, in order to optimize energy absorption. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 850 may also include (or be in communication with) a collision event sensor 858 (for example, an inertia sensor or an accelerometer) including a known collision sensor algorithm that prompts actuation of belt pretensioner 856 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the modular knee airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag comprising:
   at least one panel defining an interior of the airbag;
   a divider attached to the at least one panel so as to divide the interior into a plurality of chambers, said divider attached at least to a rear or inflator side portion of the at least one panel; and
   an internal tether attached to the at least one panel and to the divider so as to limit movement of the divider in a direction toward one of the chambers.

2. The airbag of claim 1 wherein the airbag is structured so that inflation gases enter the airbag into an uppermost chamber of the plurality of chambers.

3. An airbag comprising:
    at least one panel defining an interior of the airbag;
    a divider attached to the at least one panel so as to divide the interior into a plurality of chambers; and
    an internal tether attached to the ate least one panel and to the divider so as to limit movement of the divider in a direction toward one of the chambers, and
    wherein the tether has a first end and a second end opposite the first end, and wherein the first end is attached to the at least one panel along a first panel seam extending along at least a portion of an edge of the first end.

4. The airbag of claim 3 wherein the tether second end is attached to the at least one panel.

5. The airbag of claim 3 wherein the tether has a body with a pair of opposed side edges extending between the first and second ends, and wherein the body is attached to the divider along a first divider seam.

6. The airbag of claim 5 wherein a length of the tether between the first panel seam and the first divider seam is in the range 80 millimeters to 350 millimeters.

7. The airbag of claim 5 wherein the body is attached to the divider along a second divider seam, at a location spaced apart from the first divider seam.

8. The airbag of claim 7 wherein a leading edge of the divider is attached to a front side of the airbag along a seam structured to reside below a neck region of a passenger contacting the front side during inflation of the airbag, and wherein the first divider seam extends along the leading edge.

9. The airbag of claim 7 wherein the airbag further comprises a preferential gas flow valve operatively coupled to the divider and configured for enabling gas flow from the upper chamber into the lower chamber, and for restricting gas flow from the lower chamber into the upper chamber, and wherein a portion of the tether extending between the first and second divider seams includes an opening enabling fluid communication from the upper chamber through the opening and to the valve.

10. The airbag of claim 9 wherein a distance between at least one of the first divider seam and the second divider seam and a center of an opening in the valve connecting the upper and lower chambers is within the range 100 millimeters to 250 millimeters, inclusive.

11. The airbag of claim 7 wherein the tether second end is attached to the at least one panel along a second panel seam extending along at least a portion of a length of the second end, the second panel seam being spaced apart from the first panel seam.

12. The airbag of claim 7 wherein a portion of the tether extends between the second divider seam to the at least one panel and is attached to the at least one panel.

13. A vehicle including an airbag in accordance with claim 1.

14. A vehicle occupant protection system including an airbag in accordance with claim 1.

15. An airbag comprising:
    at least one panel defining an interior of the airbag;
    a divider positioned in the interior so as to divide the interior into an upper chamber and a lower chamber; and
    an internal tether attached to the at least one panel and to the divider so as to partition the upper chamber into a plurality of adjacent sub-chambers,
    wherein the tether is attached to the at least one panel and to the divider so as to divide the upper chamber into at least three sub-chambers.

16. The airbag of claim 1 further comprising a plurality of panels defining an interior of the airbag, and wherein the divider is attached along a perimeter thereof to each panel of the plurality of panels so as to form a gas-tight seal between the divider and each panel of the plurality of panels.

17. The airbag of claim 15 wherein the airbag has a front side and an inflation side, and wherein a first portion of the tether is positioned between inflation side and front side so as to form a first sub-chamber adjacent the inflation side on a first side of the first tether portion, and a second sub-chamber on a second side of the tether portion opposite the first side of the tether portion.

18. The airbag of claim 17 wherein a second portion of the tether is positioned between the front side and the first tether portion so as to form a second sub-chamber between the first and second tether portions, and a third sub-chamber adjacent the front side.

19. The airbag of claim 18 wherein a leading edge of the divider is attached to a front side of the airbag along a seam structured to reside below a neck region of a passenger contacting the front side during inflation of the airbag, and wherein the second portion of the tether is attached to the divider along a seam extending along the leading edge.

20. The airbag of claim 18 wherein the tether further comprises a third portion extending between and connecting the first and second tether portions.

21. A vehicle including an airbag in accordance with claim 15.

22. A vehicle occupant protection system including an airbag in accordance with claim 15.

23. The airbag of claim 11 wherein the first panel seam and the second panel seam are located within the airbag so as to reside within a zone extending from 100 millimeters to 800 millimeters from an inflator positioned in an instrument panel of a vehicle.

24. The airbag of claim 23 wherein the first panel seam and the second panel seam are located within the airbag so as to reside within a zone extending from 300 millimeters to 500 millimeters from the inflator inclusive.

25. The airbag of claim 1 wherein the tether is structured and attached to the at least one panel and to the divider so as to prevent the divider from exerting pressure on the head of a Hybrid III 3 year-old Anthropomorphic Test Device positioned in Position-2 for NHTSA Out of Position testing under FMVSS Standard No. 208.

26. The airbag of claim 25 wherein the tether is structured and attached to the at least one panel and to the divider such that a lower chamber of the airbag fills behind a head of the test device.

27. The airbag of claim 1 wherein a leading edge of the divider is attached to the at least one panel along a seam positioned so as to reside within a zone (Z) defined at a lower end (Z2) by a hip pivot of a seat Hybrid III 5th female ATD, and at an upper end (Z1) by a shoulder pivot of a seated Hybrid III 50th ATD, inclusive.

28. The airbag of claim 1 wherein the tether is attached to the at least one panel and to the divider so as to limit a shared volume of the airbag to a value within a predetermined range.

29. The airbag of claim 28 wherein the tether is attached to the at least one panel and to the divider so as to limit the shared volume to a maximum of 15% of the total internal volume of the airbag in a fully inflated condition without the divider attached.

30. The airbag of claim 1 further comprising an opening formed in the divider to enable fluid communication between chambers of the plurality of chambers, and a flow restriction valve operatively coupled to the divider for controlling gas flow through the opening.

31. A vehicle including an airbag in accordance with claim 3.

32. A vehicle occupant protection system including an airbag in accordance with claim 3.

33. An airbag comprising:
   at least one panel defining an interior of the airbag;
   a divider attached to the at least one panel so as to divide the interior into a plurality of chambers, said divider attached to a rear or inflator side portion of the at least one panel; and
   an internal tether attached to the at least one panel and to the divider so as to limit movement of the divider in a direction toward one of the chambers.

\* \* \* \* \*